United States Patent
Sundaram et al.

(10) Patent No.: US 9,887,917 B2
(45) Date of Patent: Feb. 6, 2018

(54) PORT EXTENDER

(71) Applicant: Dell Products, L.P., Round Rock, TX (US)

(72) Inventors: Shivakumar Sundaram, Tamilnadu (IN); Krishnamurthy Subramanian, Saratoga, CA (US); Anoop Ghanwani, Roseville, CA (US); Pathangi Narasimhan Janardhanan, Santa Clara, CA (US); Mohnish Anumala, Cupertino, CA (US); Raja Jayakumar, Fremont, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 3 days.

(21) Appl. No.: 15/074,998

(22) Filed: Mar. 18, 2016

(65) Prior Publication Data

US 2016/0205019 A1     Jul. 14, 2016

Related U.S. Application Data

(63) Continuation of application No. 13/798,010, filed on Mar. 12, 2013, now Pat. No. 9,294,396.

(51) Int. Cl.
| | |
|---|---|
| H04L 12/28 | (2006.01) |
| H04L 15/24 | (2006.01) |
| H04L 12/741 | (2013.01) |
| H04L 12/725 | (2013.01) |
| H04L 12/46 | (2006.01) |
| H04L 12/721 | (2013.01) |
| H04L 29/12 | (2006.01) |
| H04L 12/751 | (2013.01) |
| H04L 12/709 | (2013.01) |

(52) U.S. Cl.
CPC .......... *H04L 45/74* (2013.01); *H04L 12/4625* (2013.01); *H04L 45/02* (2013.01); *H04L 45/245* (2013.01); *H04L 45/26* (2013.01); *H04L 45/302* (2013.01); *H04L 45/566* (2013.01); *H04L 45/72* (2013.01); *H04L 45/745* (2013.01); *H04L 61/6022* (2013.01)

(58) Field of Classification Search
CPC .... H04L 12/4625; H04L 45/02; H04L 45/245
USPC ........ 370/229, 386, 389, 401; 709/224, 229, 709/238
See application file for complete search history.

(56) References Cited

U.S. PATENT DOCUMENTS

| | | | |
|---|---|---|---|
| 6,463,479 B1 | 10/2002 | Jennings et al. | |
| 6,801,950 B1 | 10/2004 | O'Keeffe et al. | |
| 6,879,588 B1 * | 4/2005 | Malalur | H04L 69/161 370/386 |
| 2013/0322457 A1 * | 12/2013 | Budhia | H04L 49/253 370/401 |

* cited by examiner

*Primary Examiner* — Alpus H Hsu
*Assistant Examiner* — Camquyen Thai
(74) *Attorney, Agent, or Firm* — Haynes and Boone, LLP

(57) ABSTRACT

An extended bridge structure that includes a controlling bridge and port extenders is disclosed. A port extender according to some embodiments of the present invention includes a processor that processes receives packets in a way that executes at least one procedure that substitutes for a function of the controlling bridge. A controlling bridge according to the present invention provides data to the port extender that enables it to execute the at least one procedure that substitutes for a function of the controlling bridge.

20 Claims, 20 Drawing Sheets

PORT EXTENDER

CROSS-REFERENCE TO RELATED APPLICATION

The present application is a continuation of U.S. patent application Ser. No. 13/798,010 filed Mar. 12, 2013, now U.S. Pat. No. 9,294,396, the disclosure of which is incorporated herein by reference.

TECHNICAL FIELD

Embodiments of the present invention are related to port extenders and, in particular, port extenders that reduce network traffic to a controlling bridge.

DISCUSSION OF RELATED ART

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Modern data centers are experiencing dramatic increases in technology to service the proliferation of Virtual Local Area Networks (VLANs) that exist in a typical data center. The need to aggregate numerous VLANs has resulted in the development of bridging technology, or bridges. Bridging allows for the aggregation of more than one VLAN. Bridges typically include a number of ports that are connected to nodes of the individual VLANs so that the bridge can service network traffic in each of the connected VLANs. Port Extension technology is further being developed to help increase the effective number of ports available to each bridge and to simplify management of the network such that total number of bridges for a given number of ports is minimized.

In operation, port extenders operate as multiplexing devices, providing pathways from individual nodes to other nodes reachable through the controlling bridge that pass through the controlling bridge. Conventional port extenders, then, simply transfer packets from nodes attached to the port extender to the controlling bridge and transfer packets from the controlling bridge to the attached nodes. Therefore, the existence of port extenders, with the associated larger number of ports, can lead to a substantial increase in network traffic through the controlling bridge.

Therefore, there is a need to develop improved architectures for bridging technologies that utilize port extenders.

SUMMARY

In accordance with aspects of the present invention, a port extender is provided. A port extender according to some embodiments includes access ports configured to exchange packets with nodes; cascade ports configured to exchange packets with downstream port extenders; uplink ports configured to exchange packets with upstream devices; memory; and a processor coupled to the memory, the access ports, the cascade ports, and the uplink ports to receive a first packet from one of the access ports, cascade ports, and uplink ports and forward a second packet in response to the first packet to a different one of the access ports, cascade ports, and uplink ports, the processor executing a procedure stored in memory that substitutes for a function of a controlling bridge.

A method of operating a port extender includes receiving a packet; and processing the packet according to a procedure that includes at least one function that substitutes for a function of a controlling bridge.

A controlling bridge according to some embodiments of the present invention includes at least one extended port associated with one or more virtual ports; a memory that stores tables; and a processor coupled to the at least one extended port and the memory, the processor executing procedures that include adding entries to tables in at least one port extender that enables the at least one port extender to perform at least one procedure in place of the controlling bridge.

A method of operating a controlling bridge includes receiving a packet; and processing the packet by executing procedures that include adding entries to tables in at least one port extender that enables the at least one port extender to perform at least one procedure in place of the controlling bridge.

An extended bridge according to some embodiments of the present invention includes a controlling bridge, the controlling bridge including at least one extended port, a processor, and a table stored in a memory; and at least one port extender, the at least one port extender coupled to the at least one extended port, the at least one port extender receiving table entries from the controlling bridge and performing at least one procedure in place of the controlling bridge.

These and other embodiments are further discussed below with respect to the following figures.

In the figures, elements having the same designations have the same or similar functions.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

In particular, the existing ports on a controlling bridge can be expanded through the use of port extenders. Both the controlling bridge and the port extenders can be considered to be IHSs as described above. In some standards, the controlling bridge and associated port extenders operate together as a single bridge having the extended number of ports. Port extenders may provide any number of ports utilizing one of the existing ports on the controlling bridge. Further, port extenders can be cascaded in order to provide more ports. As such, each port on the controlling bridge can be expanded to a number of ports, each of which are connected to a node. Port extenders may adhere to the IEEE 802.1BR standard, the VNTAG approach, or some other similar standard.

Figure 1A:
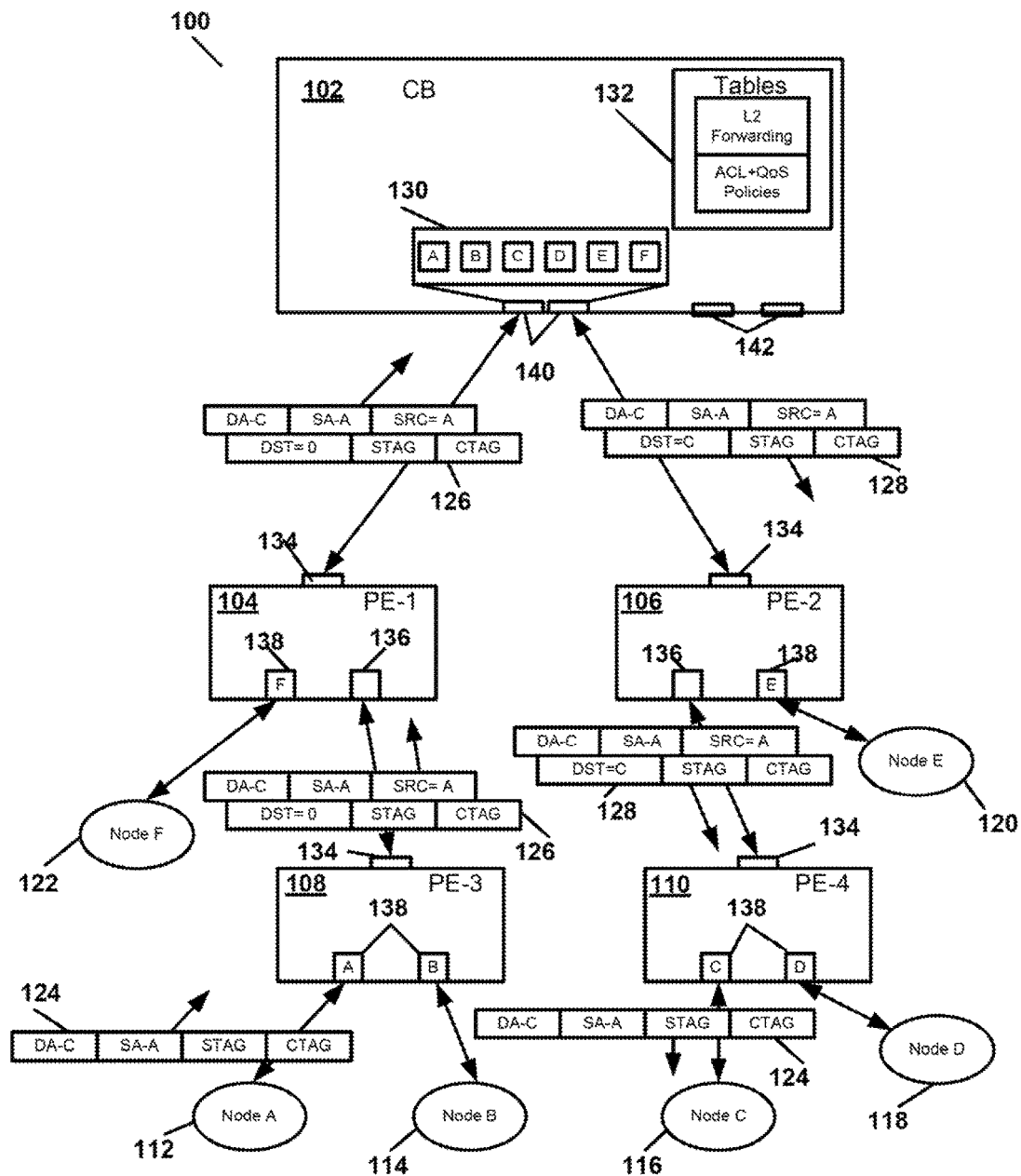
FIG. 1A illustrates an example port extender topology.

FIG. 1A illustrates an example of a bridge topology 100 that includes a controlling bridge 102 and port extenders 104, 106, 108, and 110 (also labeled PE-1, PE-2, PE-3, and PE-4, respectively). As is well known, there may be any number of port extenders 104, 106, 108, and 110 coupled to controlling bridge 102 and they may be organized in any fashion. Controlling bridge 102 may adhere to a particular standard that controls the operation of a bridge. In general, a bridge is a device that interconnects multiple Local Area Networks (LANs).

As an example, controlling bridge 102 may adhere to the IEEE 802.1D standard, which defines the operation of a bridge that permits the definition, operation, and administration of multiple IEEE 802 compatible LANs with Media Access Control (MAC) addressing. Controlling bridge 102 may also adhere to the IEEE 802.1Q standard that allows the interconnection of LANs capable of providing Virtual Bridged Local Area Networks. Port extenders discussed in this disclosure may be compatible with the IEEE 802.1BR standard or the VNTAG approach. The IEEE 802.1D, the IEEE 802.1Q, and the IEEE 802.1BR standards are each incorporated herein by reference in their entirety.

As shown in FIG. 1A, controlling bridge 102 recognizes internal extended ports 130, labeled A, B, C, D, E, and F, where extended ports 130 are associated with cascade ports 140 of controlling bridge 102. In the particular example of topology 100 shown in FIG. 1, extended ports 130 are coupled through ports 140. For example, ports 130 labeled A, B, and F may be associated with one of ports 140, the one connected to port extender 104, while ports 130 labeled C, D, and E are associated with another of ports 140, the one connected to port extender 106. In addition to cascade ports 140, which are characterized by being connected to a port extender, controlling bridge 102 may include any number of regular bridge ports 142 (also referred to herein as access ports) that are directly connected to nodes or other bridges (not shown).

As is illustrated in FIG. 1A, each of port extenders 104, 106, 108, and 110 includes an uplink port 134, cascade ports 136, and external extended ports 138. In the particular example illustrated in FIG. 1, port extender 104 and port extender 106 are coupled to ports 140 on controlling bridge 102 through respective uplink ports 134. Port extender 108 is cascaded from port extender 104 by being coupled to a cascade port 136 of port extender 104 through uplink port 134 of port extender 108. Similarly, port extender 110 is cascaded from port extender 106 by being coupled to a cascade port 136 of port extender 106 through an uplink port 134 of port extender 110. As illustrated in FIG. 1A, Node A 112 and Node B 114 are coupled to extended ports 138 of port extender 118, Node C 116 and Node D 118 are coupled to external extended ports 138 of port extender 110, Node E is coupled to an external extended ports 138 of port extender 106, and Node F is coupled to external extended ports 138 of port extender 104. Internal extended ports 130 correspond to extended ports 138 of port extenders 103, 106, 108, and 110.

As utilized in this disclosure, a node is a device that is identified by one or more MAC addresses and which can send and receive packets (also referred to as packets) of data. Nodes, which may also be referred to as end stations, are connected to a bridging topology through access ports. The MAC addresses can be associated with particular VLANs and may be associated with particular customers, which can be identified implicitly by default configuration at the external extended port in which case packets may be sent and received by the node without one or both tags, or explicitly with a service tag (STAG) and a customer tag (CTAG) that are included in a packet transmitted or received by a node. STAG and CTAG are defined in the IEEE 802.1Q standard and the IEEE 802.1Qbg standard. In some embodiments of the invention, STAG and CTAG fields are not utilized. Throughout this disclosure, packets are shown to include STAG and CTAG fields, but this should not be limiting. In some embodiments, for example, STAGs can be mapped to a difference SRC upon receipt, removing the STAG field altogether.

Upon initialization, an instantiation step is performed where each of port extenders 104, 106, 108, and 110 report upstream which ports are extension ports 138 and which ports are cascade ports 136. As a result, controlling bridge 202 includes a mapping of virtual ports at each of the port extenders into table 132. For example, port extender 108 reports extension ports 138 that include extended ports A and B to port extender 104; port extender 110 reports extension ports 138 that include extended ports C and D to port extender 106. Port extender 104 reports extension ports 138 that include extended port F and a cascade port 136 that includes extended ports A and B from port extender 104; port extender 106 reports extension ports 138 that include extended port E and a cascade port 136 that includes extended ports C and D. In that fashion, a link map of external extended ports A, B, C, D, E, and F that correspond with internal extended ports A, B, C, D, E, and F is recorded in tables 132. MAC addresses of Nodes A, B, C, D, E, and F, which are coupled to external extended ports A, B, C, D, E, and F, respectively, are not at this stage known or recorded to controlling bridge 102. In general, each of Nodes A, B, C, D, E, and F include one or more MAC addresses, which are learned in due course by controlling bridge 102. Controlling bridge 102 then builds the L2 forwarding tables of tables 132 as MAC addresses are learned and given the topology 100 that was reported on initialization.

The combination of controlling bridge 102 and port extenders 104, 106, 108, and 110 operate as a single controlling bridge that includes internal extended ports 130. Architecture 100 may, for example, operate as a single controlling bridge under the IEEE 802.1Q standard. Internally, architecture 100 may operate, for example, according to the IEEE 801.1BR standard, the VNTAG approach, or other port extender standards or approaches.

The IEEE 801.1BR standard and VNTAG approach both operate similarly to attach port extender tags to packets that are processed through the controlling bridge and the port extenders. The format of the information of the VNTAG inserted into a packet differs from the format of an E-TAG under the IEEE801.1BR standard. A VNTAG format is of the form

| VN-Tag Ethertype | d | P | DST-VIF | l | r | Ver | SRC-VIF |
|---|---|---|---|---|---|---|---| where d is a direction flag that indicates whether the packet is traveling to the bridge, p is a pointer flag that indicates whether the DST-VIF is a list or not, the DST-VIF is the virtual interface for the destination Node, l is a looped bit that indicates whether or not the packet is a multicast packet, r is reserved, ver is a version number, and SRC-VIF is the vif of the source Node. The 802.1BR Tag Format is of the form

| E-Tag Ethertype | PCP | DEI | SRC-ECID Base | r | GRP | DST-ECID Base | SRC-ECID EXT | DST-ECID EXT |
|---|---|---|---|---|---|---|---|---| where PCP is a prioritycode, DEI is a drop eligible indicator, SRC-ECID Base identifies the ingress echannel identifier of the service request with this packet, r indicates reserved bit, GRP encodes part of the echannel identifier parameter of the service request associated with this packet, DST ECID base is the destination echannel identifier parameter of the associated with this packet, SRCE ECID EXT encodes part of the ingress echannel identifier of the service request associated with the packet, and DST ECID EXT is the destination echannel identifier parameter of the service request associated with this packet. The SRC address, therefore, is encoded between the SRC ECID Base and the SRC ECID EXT. The DST address is encoded between the DST ECID Base and the DST ECID EXT.

As illustrated above, a port extender tag according to a particular standard may include any number of individual parameters. However, most standards will include a source identifier and a destination identifier in order to identify an ingress port that receives a packet or packet and the destination address (or multicast group) where the packet is destined. Therefore, for purposes of explanation, throughout this disclosure the port extender tag will be designated as including the fields

| SRC | DST |
|---|---| where SRC indicates the source VIF (SRC-VIF), ingress ECID (Ingress ECID Base and Ingress ECID EXT), or other source identifier, DST indicates the destination VIF (DST-VIF), ECID (GRP, DST ECID Base and DST ECID EXT), or other destination identifier, and the combination indicates the port extender tag according to any port extender technology. One skilled in the art will recognize that a port extender tag can include any additional parameters and will therefore represent any port extender technology that utilizes tagging. A packet that includes the SRC and DST fields as indicated above can be referred to as a tagged packet (or tagged packet).

FIG. 1A illustrates an example transmission of a packet 124 between Node A 112 and Node C 116 utilizing conventional port extenders. As illustrated in FIG. 1, packet 124 includes the destination MAC address DA-C, the source MAC address SA-A, a service tag STAG, and a client tag CTAG. It is well known that packet 124 includes other fields as well, but for purposes of illustration the destination MAC address (DA), the source MAC address (SA), the service tag (STAG), and the customer tag (CTAG) or illustrated. These fields define the particular VLAN and the MAC address of the source device and the destination device. One skilled in the art will recognize that packet 124 includes these fields in a header and the packet includes other fields as well.

Packet 124 is received into an access port 138, which is labeled A for extended port A, on port extender 108. Port extender 108 adds the port extender tag, setting SRC to A and DST to 0, and forwards packet 126 through uplink port 134 to cascade port 136 of port extender 104. Port extender 104, through uplink port 134 of port extender 104, forwards packet 126 to ports 140 of controlling bridge 102.

Controlling bridge 102 performs an L2 level look-up utilizing table 138 and the destination MAC DA, which is set to C, to determine the DST. Controlling bridge 102 further utilizes the SRC, along with other fields in the packet header to execute ACL and QoS policies. As a result of the processing in controlling bridge 102, and provided that packet 126 is not to be dropped according to the ACL and QoS policies, the DST is set to the extended port C and packet 128 is created for transmission. Controlling bridge 102 then forwards packet 128 through one of ports 140 to uplink port 134 of port extender 106. Port extender 106 forwards the packet through cascade port 136 to uplink port 134 of port extender 110. Port extender 110 removes the port extender tag and forwards packet 124 to Node C 116 through the extender port 138 labeled C. Port extenders 106 and 110 both perform port extender lookups in order to route packet 128 to an cascaded port 136 or a access port 138.

As shown in FIG. 1A, tables 132 of controlling bridge 102 includes information for directing packet traffic through extended ports 130, which indicate which extended ports are associated with each of Nodes A, B, C, D, E, and F. Further, all access control logic (ACL) and quality of service (QoS) rules are implemented in controlling bridge 102. Even packets that are sourced on Node A and directed to Node B would travel through controlling bridge 102 for processing. Conventionally, port extenders 104, 106, 108, and 110 are simple devices that act much like multiplexers to direct traffic to output ports in a very simplified way: all traffic arriving at an ingress port are tagged with a port extender tag and directed to an uplink port; all traffic arriving from a cascaded port extender are directed to an uplink port; all traffic arriving at an uplink port are directed to a cascade port or external extended port according to the DST field.

Figure 1B:
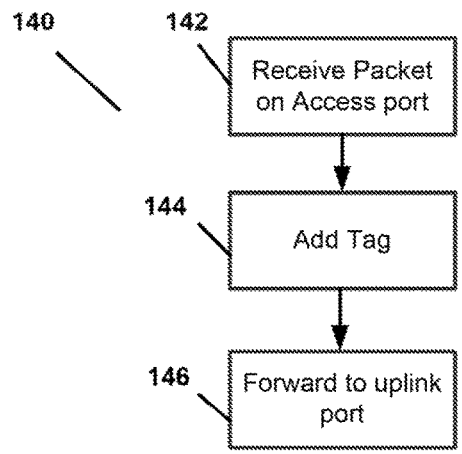
FIGS. 1B, 1C, and 1D illustrate procedures for operation of a conventional port extender.
Figure 1C:
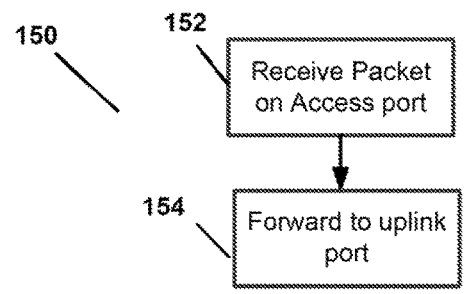
Figure 1D:
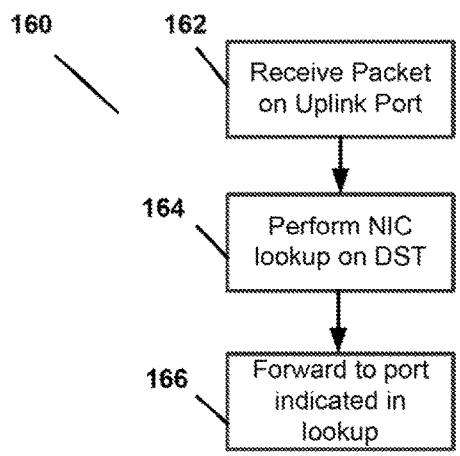

FIG. 1B illustrates a procedure 140 that is executed by a port extender. As shown in FIG. 1B, in step 142 a packet is received on an access port 138. In step 144, a port extender tag is added setting SRC=ingress external extended port 138 and DST=0. In step 146, the port extender forwards the tagged packet to the uplink port 134. FIG. 1B illustrates a procedure 150 that is executed by a port extender when a packet is received at a cascade port 136. As illustrated in FIG. 1C, in step 152 a packet is received at an access port 136. In step 154, the port extender forwards the packet to an uplink port 134. FIG. 1D illustrates a procedure 160 executed by a port extender when a packet is received on an uplink port 134. In step 162, the packet is received at the uplink port 134. In step 164, the port extender performs a NIC lookup utilizing the DST. In step 166, the port extender forwards the packet to the port indicated in the lookup, removing the port extender tag if that port is an access port 138.

Figure 1E:
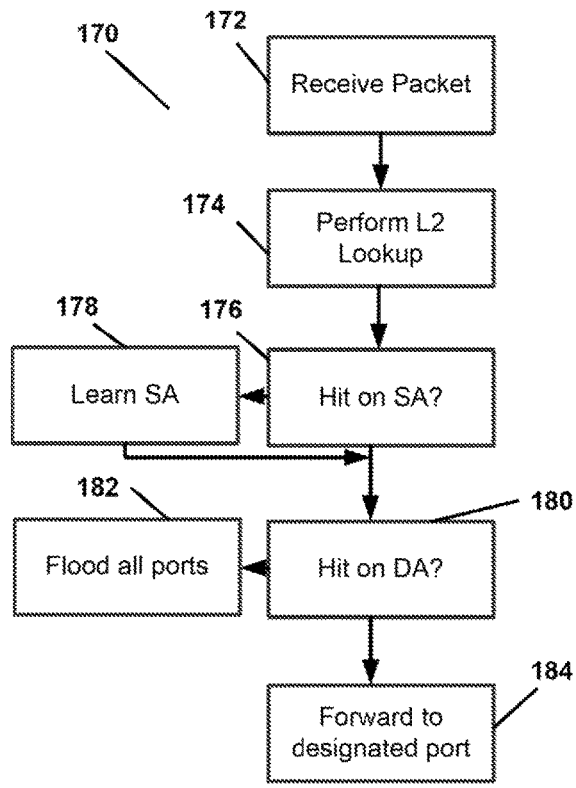
FIG. 1E illustrates procedures for operation of conventional controlling bridge.

FIG. 1E illustrates a procedure executed by a control bridge 102. In step 172, a packet is received by the controlling bridge. The packet may arrive at either an access port 142 or an extended port 140 of controlling bridge 102. In step 174, controlling bridge 102 performs an L2 lookup utilizing SA and DA. In step 176, procedure 170 determines whether there is a hit on SA. If not, then procedure 170 executes step 178 to learn SA and include the SA address and links in table 132. If there is a hit, the procedure 170 determines if there is a hit on DA in step 180. If not, then in step 182 controlling bridge 182 generates packets in order to flood all ports. If there was a hit then controlling bridge 182 forwards the packet to the destination port. If the destination port is through a port extender through extended ports 140, the controlling bridge 182 adds or modifies a port extender tag to the packet to set SRC=the ingress port and DST=destination. If the destination port is an access port 142, then controlling bridge 102 removes any port extender tag before forwarding the packet.

Consequently, all packets received into port extenders are forwarded to controlling bridge 102 even if the source and destinations are reachable locally by the port extender. This process is very inefficient and may result in high network latency and traffic bottlenecks at controlling bridge 102. Further, the suboptimal forwarding results in more bandwidth requirements for uplinks as all traffic traverses the uplink ports from port extenders to reach controlling bridge 102, resulting in higher costs.

Further, current port extenders do not support active/active multipathing. In a conventional system, if there are multiple paths available the multiple paths will be pruned until there is one active path.

Accordingly, in some embodiments of the invention port extenders are provided that address the latency and costs concerns of conventional port extenders. In some embodiments, port extenders with small table sizes that can provide local switching can be utilized. In some embodiments, port extenders can locally implement ACL and QoS policies to prevent unwanted packets from traveling through the controlling bridge. In some embodiments, port extenders can support multipathing, and in particular active/active multipathing. In some embodiments of the present invention, a multipathing LAG can be utilized to prevent this pruning. In active/active multipathing, packets can be forwarded on any of the available paths identified in the LAG.

In particular, a port extender according to some embodiments of the present invention can perform limited lookups with respect to nodes that are directly reachable from that port extender. Port extenders according to embodiments of the present invention do not have the lookup capability for switching to nodes that are not connected downstream through the port extender. As opposed to a network switch or a controlling bridge, a port extender according to the present invention only includes table entries related to nodes directly connected downstream from that node extender and does not include entries for all of the nodes on the topology. Further, port extenders according to the present invention do not have the capability to learn. Instead, tables in the port extender are updated by a controlling bridge through a control protocol. Consequently, port extenders according to the present invention include table entries that are controlled by the controlling bridge.

In the present disclosure the direction "upstream" means to forward in a direction towards the controlling bridge and the direction "downstream" means to forward in a direction towards the end-point nodes. As a further consideration, in the notation utilized throughout the present disclosure care should be taken to distinguish between extended ports and nodes. For example, in FIG. 1A Node A 112 is connected to port extender 108 through an access port 138 which is assigned the ID Node A. Before the MAC address for Node A is learned on control bridge 102, there is no linkage between the MAC address A and the Node A in table 132. Once MAC Address A is learned by control bridge 102, then MAC address A is linked to extended port A and the associated pathway from control bridge 102 and the port 138 of port extender 108 associated with extended port A, which is discovered during instantiation of topology 100, is established.

Figure 2:
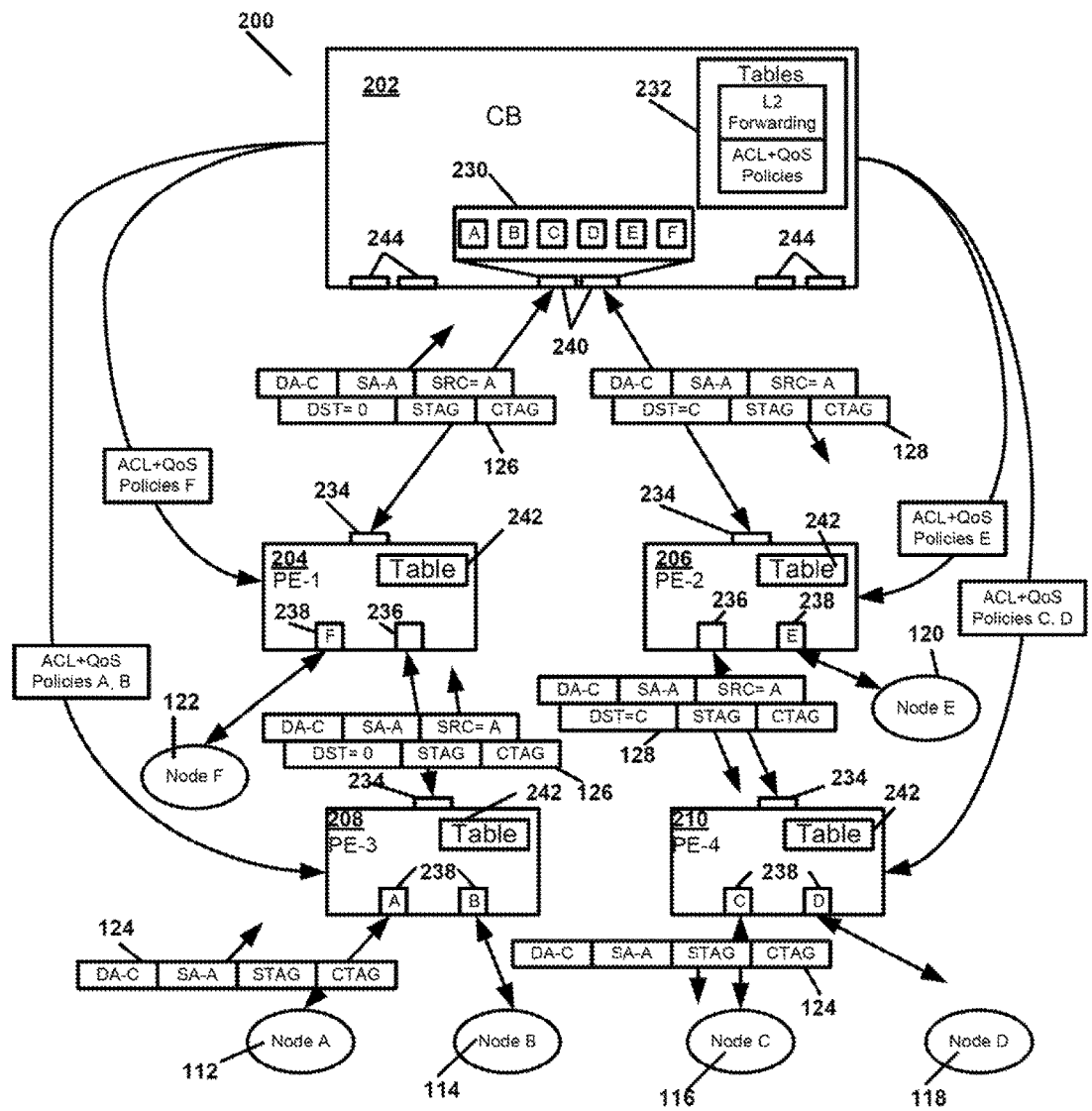
FIG. 2 illustrates an example port extender topology according to some embodiments of the present invention.

FIG. 2 illustrates a port extender topology 200 according to some embodiments of the present invention. As shown in FIG. 2, topology 200 includes controlling bridge 202 and port extenders 204, 206, 208, and 210. As illustrated in FIG. 2, each of port extenders 204, 206, 208, and 210 includes extended ports 238, cascade ports 236, and uplink ports 234. Cascade ports 236 are connected to other port extenders. Access ports 234 are connected to nodes. Uplink ports 234 are connected to extended ports 240 of controlling bridge 202 or to a cascade port 236 of an upstream port extender. Uplink ports 234 may be Link Aggregation Groups (LAGs) or physical ports.

As shown in FIG. 2, cascade port 236 of port extender 204 is connected to uplink port 234 of port extender 208 and cascade port 236 of port extender 206 is connected to uplink port 234 of port extender 210. Uplink port 234 of port extender 204 and uplink port 234 of port extender 206 is connected to extended ports 240 of controlling bridge 202. Controlling bridge 202 includes extended ports 240 and access ports 244. Extended ports 240 are connected to port extenders while access ports 244 are connected to nodes (not shown).

As is further illustrated in FIG. 2, extended ports 238 of port extenders 204, 206, 208, and 210 are connected to nodes. In topology 200 illustrated in FIG. 2, extended ports 238 of port extender 208 are connected to Node A 112 and Node B 114; extended ports 238 of port extender 210 are connected to Node C 116 and Node D 118; extended port 238 of port extender 206 is connected to Node E 120; and extended port 238 of port extender 204 is connected to Node F 122. Controlling bridge 202, upon detection of port extenders 204, 206, 208, and 210, instantiate extended ports based on a control protocol exchange between port extenders 204, 206, 208, and 210 and controlling bridge 202. In general, in topology 200 extended ports are instantiated by each port extender reporting upstream the extended ports and port extenders that are connected to it. In topology 200 illustrated in FIG. 2, port extender 208 reports extended ports A and B to port extender 204. Port extender 204 reports extended port F and port extender 204 with extended ports A and B to controlling bridge 202. Similarly, port extender 210 reports extended ports C and D to port extender 206. Port extender reports extended port E and port extender 210 with extended ports C and D to controlling bridge 202. As a result, controlling bridge 202 then builds a map of topology 200 in table 232 and appropriate sub-maps of topology 200 are then included in tables 242 of port extenders 204, 206, 208, and 210.

In some embodiments, each of port extenders 204, 206, 208, and 210 are capable of executing ACL and QoS policies regarding extended ports 238. Once the external extended ports in topology 200 are instantiated, the corresponding policies (ACL and QoS policies) for that extended port are associated in tables 232 of controlling bridge 202 and then controlling bridge 202 downloads the ACL and QoS policies to the corresponding one of port extenders 204, 206, 208, and 210 associated with the extended ports. The policy can then be implemented on the corresponding one of port extenders 204, 206, 208, and 210, with the potential result that disallowed packets are dropped by the port extenders without reaching, and increasing the traffic through, controlling bridge 202.

FIG. 2 further illustrates transmission of a packet 124 from Node A 112 to Node C 116 in topology 200. For purposes of the example illustrated in FIG. 2, packet 124 represents the first packet transmitted from Node A 112. As shown in FIG. 2, packet 124 arrives at extended ports 238 of port extender 208. Port extender 208 attaches a port extender tag and transmits packet 126 to port extender 204 through cascade port 236. Port extender 204 then transmits packet 126 to controlling bridge 202. ACL and QoS policies for Node A are executed in port extender 208. Packet 124 can be forwarded or dropped by port extender 208 according to those policies. In addition to the ACL and QoS policies, controlling bridge 202 can download the extended port and services tag (STAG) corresponding to the extended port with the ACL and QoS policies to the corresponding port extender in order to identify the correct extended port. Communications with port extenders 204, 206, 208, and 210 can be accomplished through control plane protocols between controlling bridge 202 and port extenders 204, 206, 208, and 210.

Controlling bridge 202, may also execute the ACL and QoS policies, before forwarding packet 128, which contains both the SRC and DST, to port extender 206. Port extender 206 then forwards packet 128 to port extender 210. Port extender 210 removes the port extender tag and forwards packet 124 to its destination Node C 116. Packets thereafter received from Node A 112 can be checked against the ACL and QoS policies for Node A 112 resident in table 242 of port extender 208 and the packet either forwarded, dropped, or edited according to those policies.

Figure 3A:
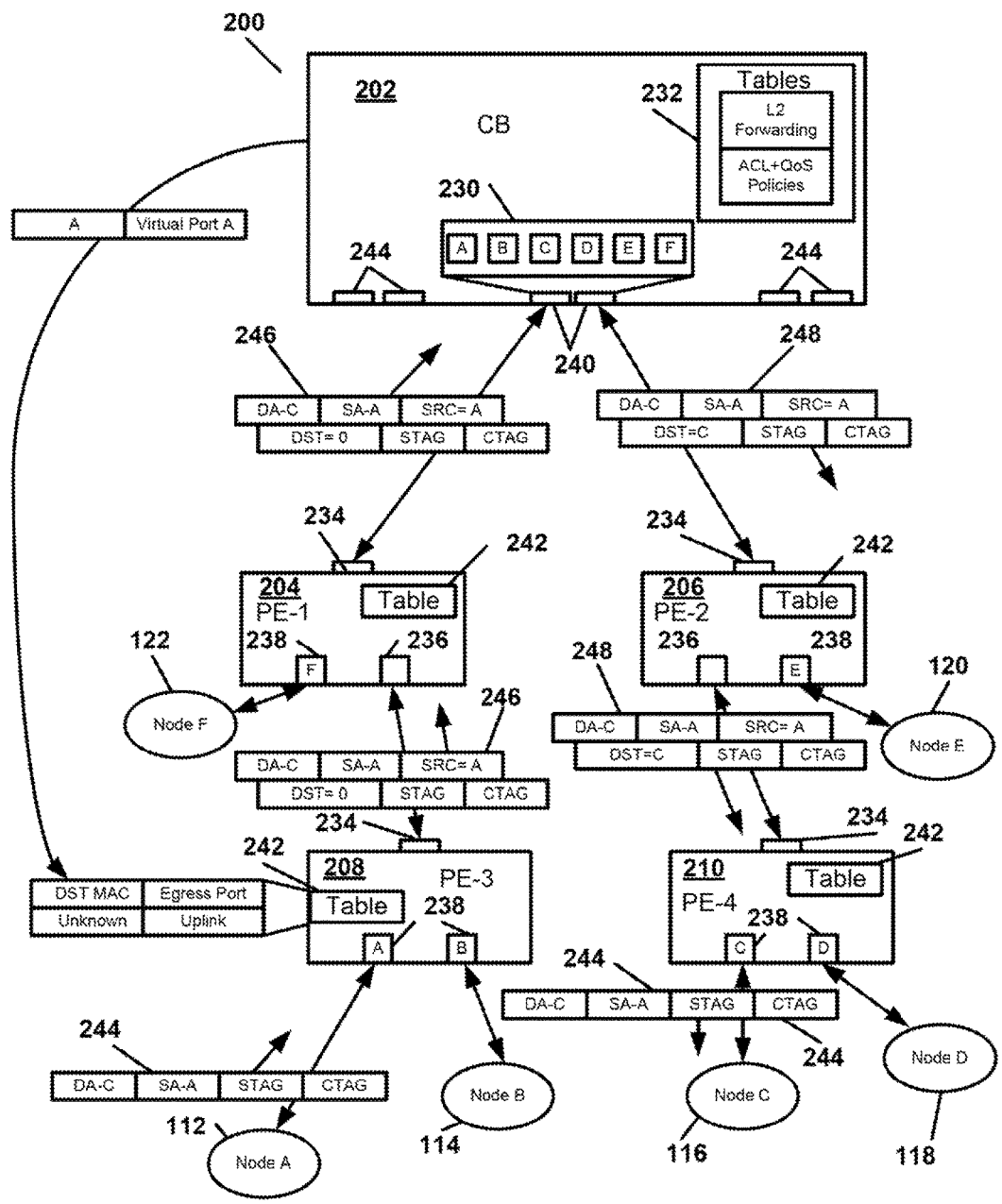
FIGS. 3A, 3B, and 3C illustrate operation of an example port extender topology according to some embodiments of the present invention.
Figure 3B:
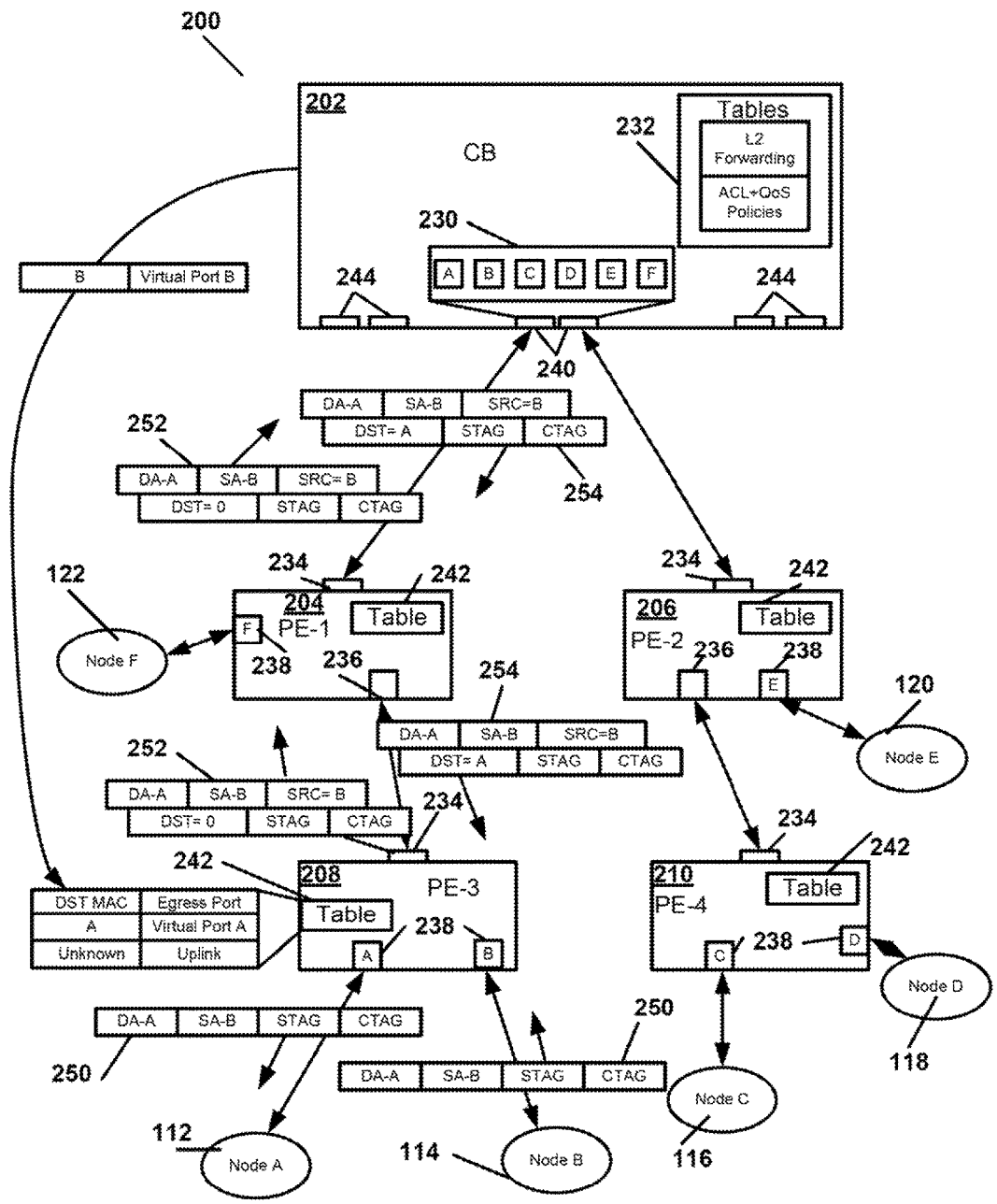
Figure 3C:
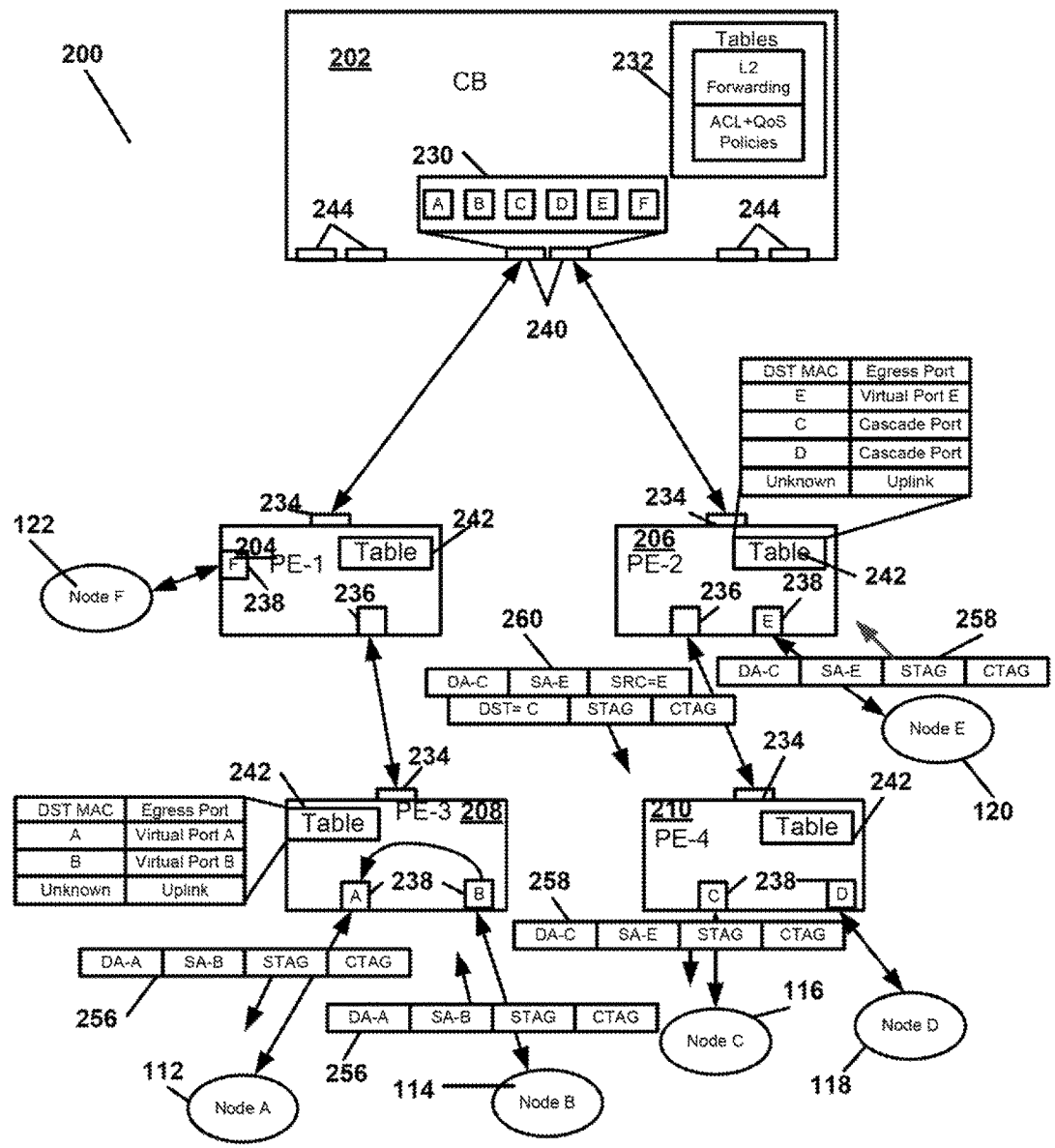

FIGS. 3A, 3B, and 3C illustrates embodiments of topology 200 where port extenders 204, 206, 208, and 210 also have the capability of local switching in order to reduce traffic to controlling bridge 202. As discussed above, each of port extenders 204, 206, 208, and 210 have one or more of extended ports 238 and one or more cascade ports 236. In the particular example shown in FIG. 3A, port extenders 204 and 206 have both access ports 238 and cascade ports 236 while port extenders 208 and 210 have access ports 238 and no cascade ports 236. Access ports 238 can become cascade ports 236 if another port extender is connected to it, otherwise access ports 238 are connected to nodes or left unoccupied. A port on any one of port extenders 204, 206, 208, and 210 can be either an extended port 238 or a cascade port 236, depending on whether the port is connected to another port extender or to a node. Port extenders 204, 206, 208, and 210 do not have learning capability, which is either disabled or not existent.

On packets received at one of access ports 238, the associated port extender will perform an L2 lookup utilizing SA and DA as the key. On packets received at cascaded ports 236, or uplink Link Aggregation Groups (LAGs), the associated port extender in some embodiments can perform an L2 lookup with SA and DA as keys.

If the packet is received on an access port 238, then the port extender can assign it to an extended port based on the ingress port ID and the STAG. The port extender then performs an L2 table lookup with the MAC DA and the MAC SA. If the L2 table identifies both the DA and the SA within table 242, then the PE forwards the packet based on the destination port derived from the L2 table lookup. If one or both of the DA and SA are not identified in the L2 table lookup, then the packet is forwarded to the uplink LAG with the SRC set to the ingress port and the DST set to 0 while retaining STAG and CTAG in the packet.

If a packet is received on a cascaded port 236 with a tagged packet (i.e. a packet having a port extender tag), a Port Extender based lookup is performed and the packet is forwarded to the identified uplink LAG unmodified. If a packet arrives on an uplink LAG with a tagged packet from controlling bridge 202 or an upstream port extender, the port extender performs an NIV lookup and forwards the packet based on the DST field in the tag field. Multicast packets and flooding packets can be handled according to the appropriate technology (e.g., VNTAG or IEEE 802.1BR standard) as appropriate. Controlling bridge 200 forwards packets consistent with the standard used by the controlling bridge (e.g., IEEE 802.1Q and IEEE 802.1BR). However, whenever a new MAC address is learned that corresponds to an extended port on a particular port extender, the following actions are taken: The MAC is learned on the extended port, a control message is sent to the port extender that corresponds to the extended port instructing it to associate the MAC and the CVLAN with the extended port on the ingress PE, and the control message also contains the SRC and STAG for the port extender device to identify the extended port with which the MAC and CVLAN needs to be associated.

Figure 3D:
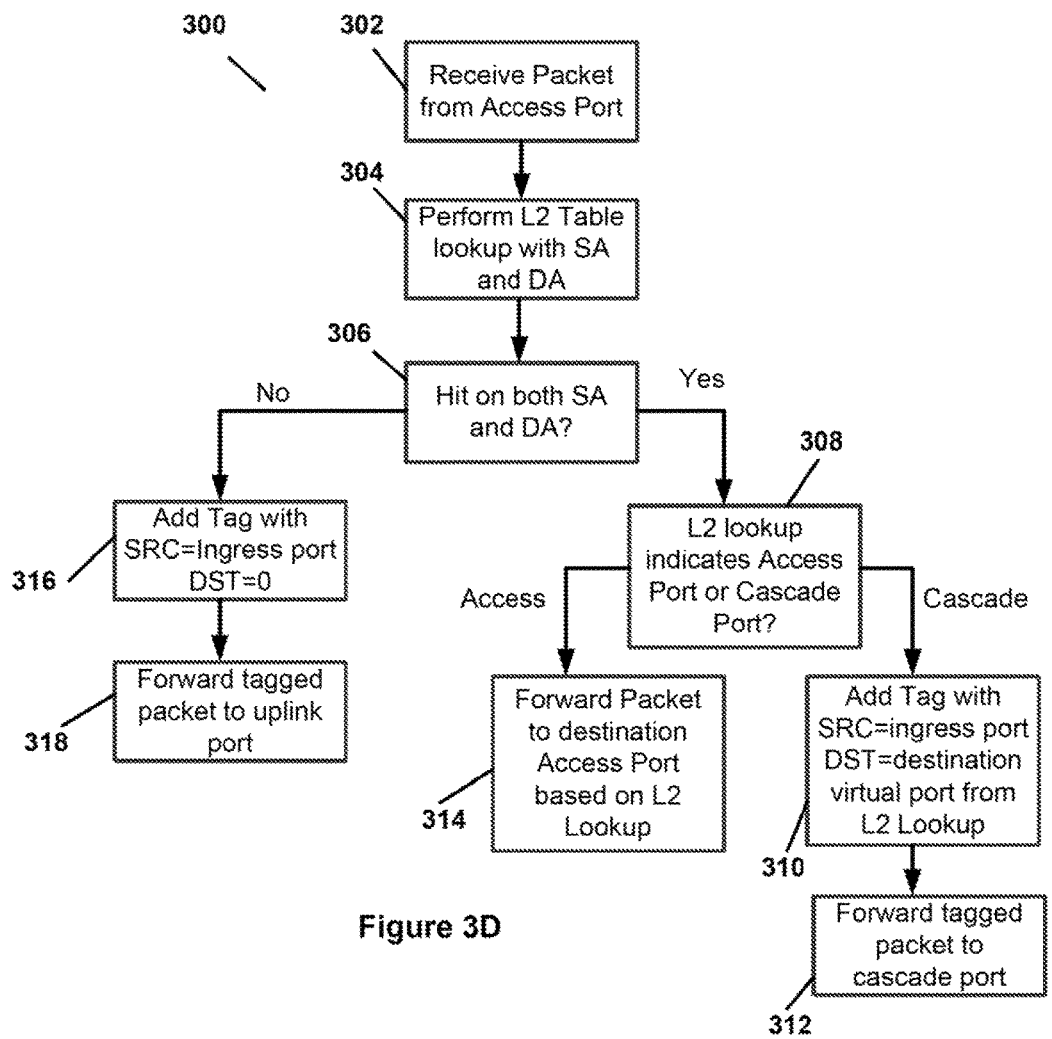
FIGS. 3D, 3E, and 3F illustrate procedures for operation of a port extender according to some embodiments of the present invention.
Figure 3E:
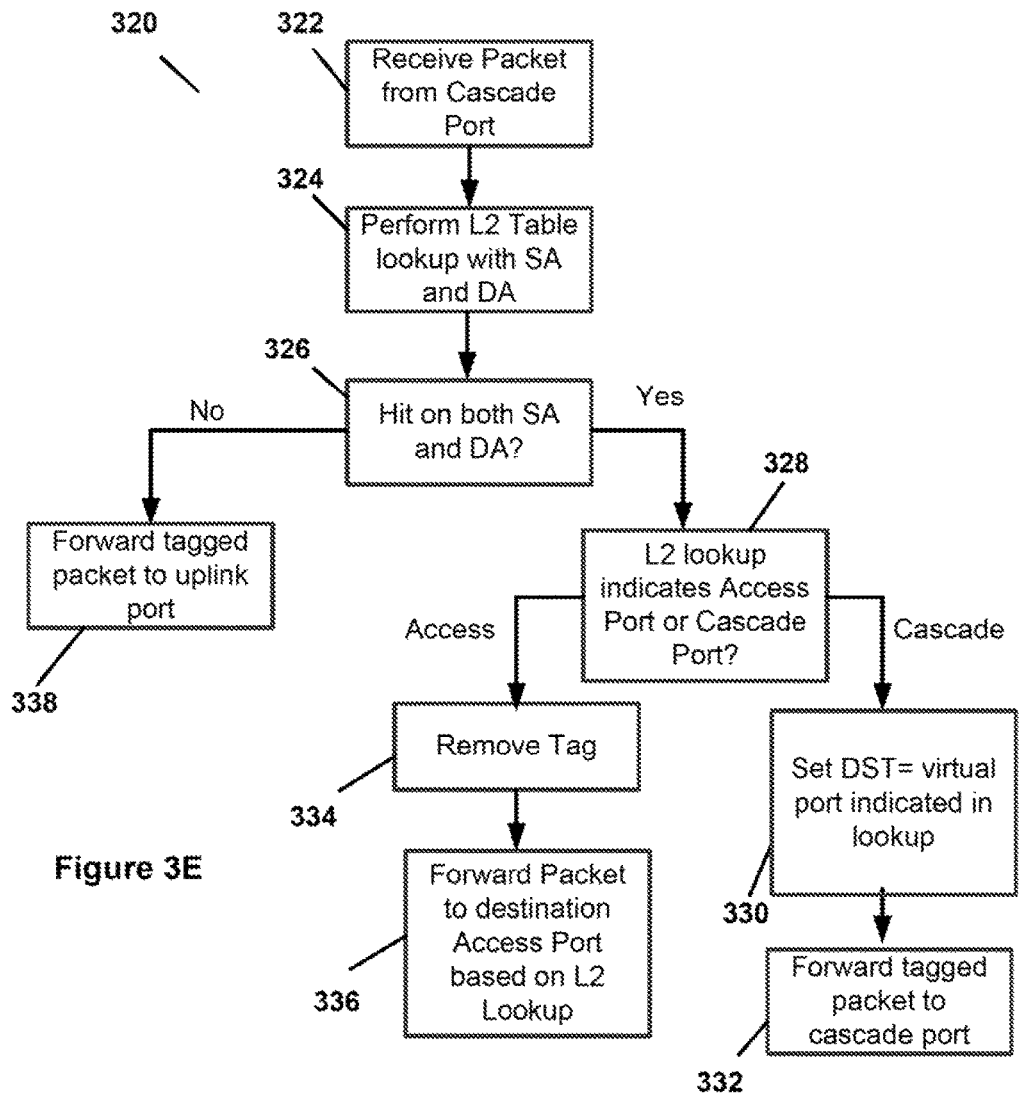
Figure 3F:
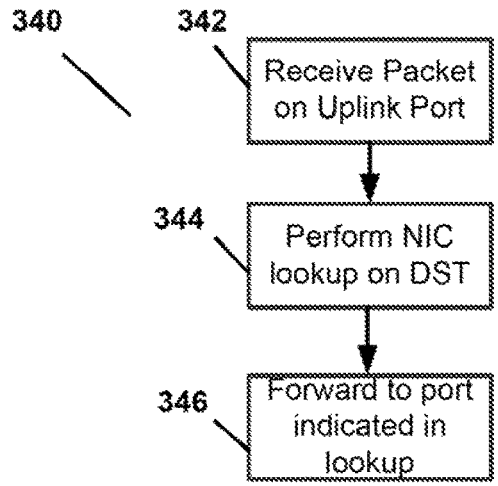

FIGS. 3D, 3E, and 3F illustrate procedures performed on a port extender according to some embodiments of the present invention. Procedure 300 shown in FIG. 3D illustrates operation of a port extender when a packet is received into an access port 238 in step 302. In step 304, the port extender performs an L2 table lookup on table 242 utilizing SA and DA as keys. In step 306, procedure 300 determines whether or not there is a hit on both SA and DA. If not, then in step 316 procedure 316 adds a port extender tag to the packet with SRC set to the ingress access port and DST set to 0. If there was a hit on both SA and DA in table 242, the procedure 300 proceeds to step 308. In step 308, procedure 300 determines whether the destination associated with DA is an access port 238 or a cascade port 236. If the destination is an access port 238, then procedure 300 executes step 314 and forwards the packet to the destination Access Port indicated by the L2 lookup. If the destination is through a cascade port 236, then procedure 300 executes steps 310 and 312. In step 310, a port extender tag is added to the packet with SRC set to the ingress extended port identifier and DST set to the destination extended port indicated by the L2 lookup. In step 312, procedure 300 forwards the tagged packet to the associated cascade port 236.

FIG. 3E illustrates a procedure 320 where in step 320 a packet is received into a cascade port 236. In step 323, procedure 320 checks whether DST is 0. If not, then procedure 320 discards the packet in step 325. If DST is 0, then procedure 320 proceeds to step 324. In step 324, the port extender performs an L2 table lookup on table 242 with SA and DA. In step 326, procedure 320 determines whether there is a hit on both SA and DA or not. If there is no hit, the procedure 320 proceeds to step 338 where the packet, which is already tagged with a port extender tag, is forward to uplink port 234. If there is a hit on both SA and DA, then procedure 320 determines whether the lookup on DA indicated an access port 3288 or a cascade port 236 from that port extender. If procedure 320 determines that DA is associated with an access port 238, then procedure 320 executes steps 334 and 336. In step 334, the port extender tag is removed. In step 336, procedure 320 forwards the untagged packet to the access port 238 identified in the L2 table lookup. If the L2 table lookup indicated a extended port accessible through a cascade port 236, then procedure 320 executes step 330 and 332. In step 330, the port extender tag in the packet is modified to set DST to the extended port indicated in the lookup. In step 332, procedure 320 forwards the packet to the cascade port 326 indicated for the extended port indicated in the lookup.

FIG. 3F illustrates a procedure 340 where in step 342 a packet is received on an uplink port 234 in step 342. In step 344 a port extender lookup is performed on DST. In step 346, procedure 340 forwards the packet to the port indicated in the DST lookup. If the port is an access port 238, the port extender tag is removed before forwarding. If the port is through a cascade port 236, then the tagged packet is forwarded.

Figure 3G:
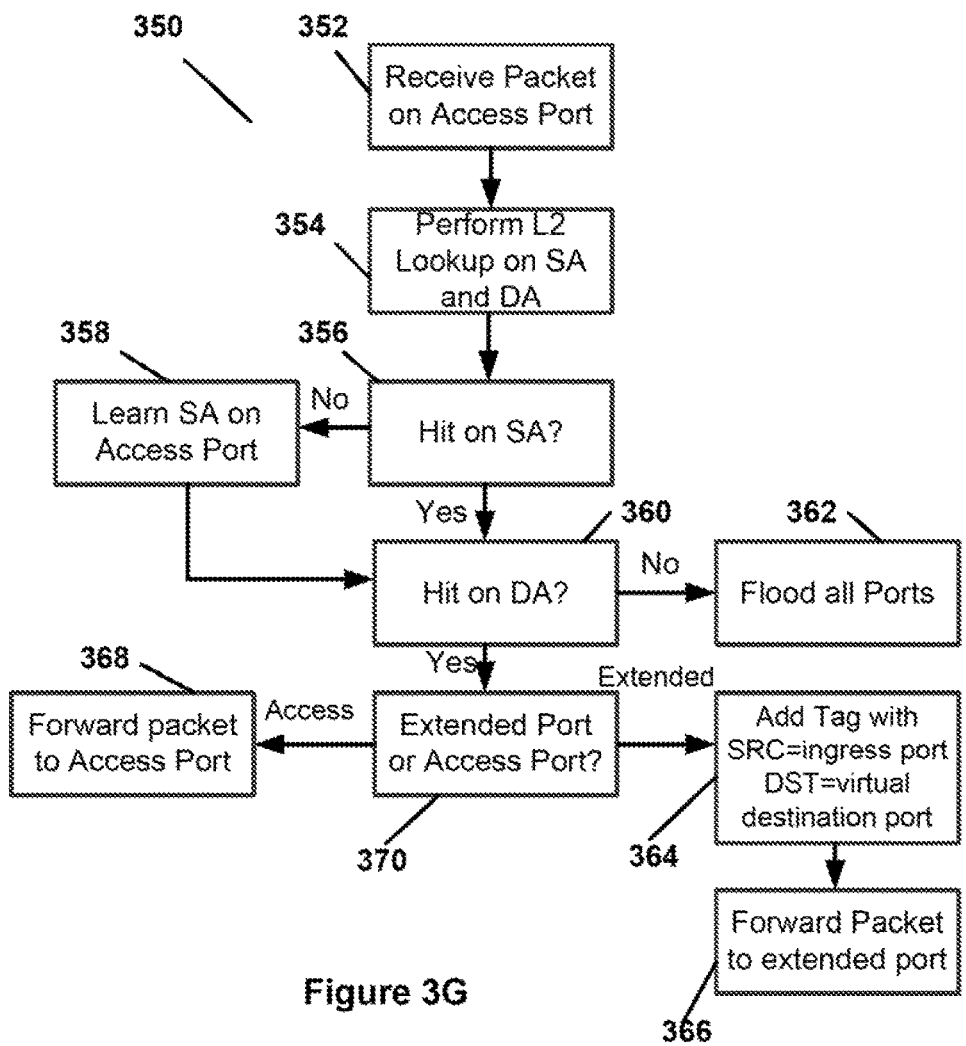
FIGS. 3G and 3H illustrate procedures for operation of a controlling bridge according to some embodiments of the present invention.

FIG. 3G illustrate a procedure 350 performed on a controlling bridge like controlling bridge 202 where a packet is received on an access port 244 of the controlling bridge in step 352. In step 354, procedure 350 performs an L2 lookup on table 232 utilizing SA and DA. In step 356, procedure 350 checks whether there was a hit on SA. If not, then procedure 358 learns SA and associates it with the ingress access port 244 in table 232. In the learning process, the ACL and QoS policies for SA are also learned and associated in table 232. If there was a hit on SA, procedure 350 proceeds directly to step 360 without executing step 358 and determines whether there was a hit on DA. If there was no hit on DA, the procedure 358 floods all ports with the packet in step 362. If there was a hit on DA, the procedure 350 determines in step 370 whether DA is associated with an extended port 240 or an access port 244. If DA is associated with an access port 244, then in step 368 the packet is forwarded to the indicated access port 244. If DA is associated with an extended port 240, then procedure 350 executes steps 364 and 366. In step 364, a port extender tag is added to the packet where SRC is set to the ingress access port and DST is set to the destination extended port. In step 366, procedure 350 forwards the packet to the indicated extended port 240.

Figure 3H:
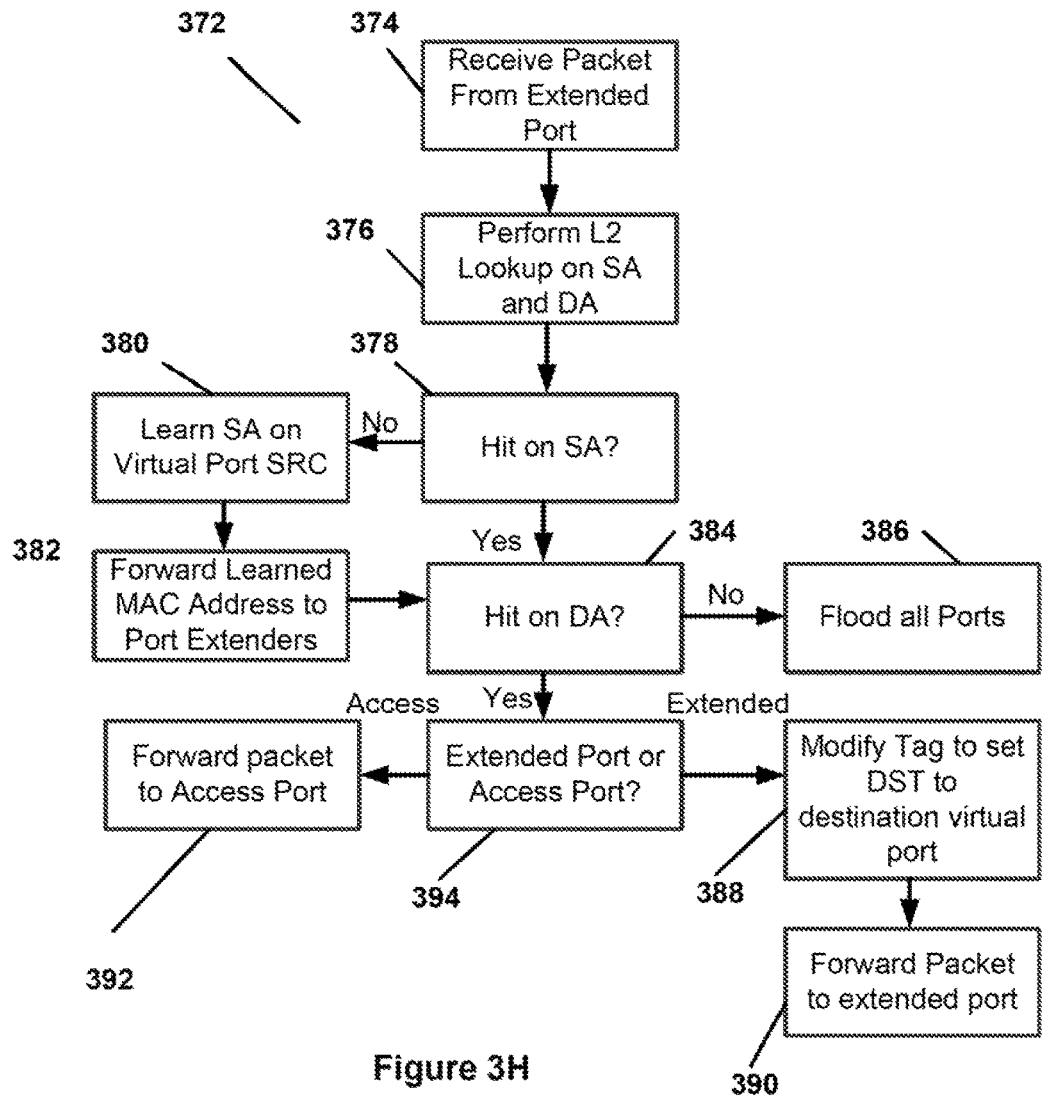

FIG. 3H illustrates a procedure 372 performed on a controlling bridge like controlling bridge 202 where a packet is received on an extended port 240 of the controlling bridge in step 374. In step 376, an L2 lookup is performed on table 232 with SA and DA as key. In step 378, procedure 372 determines whether or not there is a hit on SA. If not, then procedure 372 executes step 380 and 382. In step 380, SA is learned and associated with the extended port or extended port LAG indicated in SRC (and optionally STAG) on the CVLAN indicated by the CTAG. In step 382, the learned MAC address is forward to all port extenders associated with the extended port or extended port LAG indicated in SRC. If there is a hit on SA in step 378 then steps 380 and 382 are not performed and procedure 372 checks whether there is a hit on DA in step 384. If there is no hit on DA, then procedure 372 floods all ports in step 386. If there is a hit on DA, the procedure 372 determines whether the indicated destination port is an access port 244 or is an extended port through extended ports 240. If the indicated destination port is an access port 244, then procedure 372 removes the port extender tag and forwards the packet to the indicated access port 244 in step 392. If the indicated port is a extended port accessible through an extended port 240, then procedure 372 executes steps 388 and 390. In step 388, the port extender tag is modified to set DST to the destination extended port. In step 390, the packet is forward to the associated one of extended ports 240.

FIGS. 3A, 3B, and 3C illustrate the local switching of packets in the example of topology 200. As shown in FIG. 3A, packet 244 is associated with extended port A by port extender 208. Port extender 208 then performs an L2 table lookup utilizing SA (the MAC address) as a key. As illustrated in FIG. 3A, SA=A is not known listed in table 242. Consequently, port extender 238 adds a port extender tag where SRC=extended port A and DST=0 and forwards the resulting tagged packet 246 to port extender 204. In some embodiments, port extender 204 forwards the tagged packet 246 to controlling bridge 202. In some embodiments, port extender 204 may perform an L2 lookup on SA=A and DA=C as well before forwarding tagged packet 246 to controlling bridge 202.

Controlling bridge 202, upon receipt of packet 246, performs an L2 lookup in table 232 utilizing SA=A and DA=C and, not finding SA=A, learns MAC address A and associates it with extended port A. Controlling bridge 202 then communicates the information linking MAC address A with extended port A into table 242 of port extender 208, as shown. Controlling bridge 202 may also communicate the information to table 242 of port extender 204 as the intermediate port extender. As discussed above, ACL and QoS information regarding MAC address A may be communicated to the port extenders as well.

Controlling bridge 202 forwards packets according to the appropriate technology (e.g., VNTAG or IEEE 802.1BR standard). Whenever controlling bridge 202 receives a packet from a port extender that includes a MAC address that is not yet included in tables 232, it records the forwarding information to tables 232 and a control message is sent to the port extender that corresponds to the extended port instructing the port extender to learn the MAC address on the extended port on the access port extender. Consequently, as shown in FIG. 3A, since the MAC address from Node A is not included in table 242 or table 232, controlling bridge 202 learns Node A and communicates to port extender 208 with a control message to also learn Node A into table 242 of port extender 208. The control message includes the virtual identification labeled SRC (src-vif or Ing-ECID), optionally STAG for Node A, to identify the port on which the MAC needs to be learned.

As further illustrated in FIG. 3A, controlling bridge forwards packet 248 with DST set to the destination C according to the updated L2 lookup in table 232. If DA-C is not included in table 232, then controlling bridge 202 may flood the packet to port extenders 204, 206, 208, and 210 in order to make sure that packet 244 arrives at Node C. However, as illustrated in FIG. 3A, packet 248 destined for extended port C is forwarded through port extender 206 to port extender 210. Port Extender 210 does a port extender based lookup, removes the port extender tag, and forwards the recovered packet 244 to the destination, Node C.

FIG. 3B illustrates a transmission of a subsequent packet 250 from Node B 114 to Node A 112. As illustrated in FIG. 3B, packet 250 is received into an extended port 238 of port extender 208. However, although the destination MAC address A is included in table 242 as described with respect to FIG. 3A, the source MAC address B is not. Therefore, port extender 208 attaches the port extender tag with SRC set to extended port B and DST set to 0 and forwards the packet through uplink 234 of port extender 238 through port extender 204 to controlling bridge 202. As this is the first packet from Node B, controlling bridge 204 learns MAC address B and associates it with SRC extended port B. Controlling bridge 204 then sends a control message to port extender 208 with the MAC address B and extended port B associated for addition to table 242 of port extender 208. Controlling bridge 202 then sets DST to A and transmits packet 254 through port extender 204 to port extender 208, which delivers recovered message 250 without the added port extender tag to Node A 112.

FIG. 3C illustrates transmission of a subsequent packet 256 from Node B 114 to Node A 112. As illustrated in FIG. 3C, packet 256 is received at an extended port 238 of port extender 208. However, now when port extender 208 performs an L2 lookup in table 242, both the destination MAC address DA-A and the source MAC address SA-B are found. Under this circumstance, port extender 208 forwards packet 256 directly to its destination Node A 112. As a result, neither of port extender 204 nor controlling bridge 202 receive a packet and packet 256 does not increase the network traffic through controlling bridge 202 or port extender 204.

As is further illustrated in FIG. 3C, in some embodiments tables 204 in port extenders 204 and 206 subsequently can include entries for each of the nodes attached to them, even if the link is through a cascaded port extender. As shown in FIG. 3C, port extender 206 may route a packet received from Node E 120 to one of Node C 116 or Node D 118. As illustrated in FIG. 3C, packet 258 received by an extended port 238 of port extender 206 from Node E 120 can be directed to destination Node C 116 by port extender 206. As shown, table 242 of port extender 206, both addresses E and C are entered into the table. Since port C is accessed through a cascade port 236, port extender 206 can add a port extender tag with SRC set to E and DST set to C to create packet 260 and send packet 260 to port extender 210. Port extender 210 processes packet 260 as it would any other packet received through uplink port 234, resulting in the packet 258 being delivered to Node C 116.

As illustrated in FIGS. 3A, 3B, and 3C, port extenders 204, 206, 208, 210 include sufficient memory and processing circuitry (e.g., processors) to perform the appropriate L2 lookup functions and forward packets accordingly. However, as is further illustrated, port extenders 204, 206, 208, and 210 do not include the ability to performing IEEE 802.1Q MAC address learning, instead tables 242 of port extenders 204, 206, 208, and 210 are built by control messages from controlling bridge 202. Only when tables 242 are appropriately filled can port extenders 204, 206, 208, and 210 forward packets without involving controlling bridge 202. When there is no SA or DA miss in table 242, packets can be routed through the port extender. However, if there is either an SA or DA miss in table 242, packets are routed through controlling bridge 202 as described above. In some embodiments, port extenders can forward packets without involving controlling bridge 202 even if the extended port is accessible through a cascaded port extender. Further, port extenders 204, 206, 208, and 210 can also execute the appropriate ACL and QoS policies, as discussed above with respect to FIG. 2, on received packets.

In some embodiments, port extenders can perform L3 switching on port extenders 204, 206, 208, and 210. Controlling bridge 202 can send a control message to all port extenders indicating which destination MAC addresses are to be treated as router-macs when they are received by a port extender. Port extenders, on access ports 238, can install these MAC addresses as router MAC addresses in tables 242 such that when a packet with the destination MAC address equal to the router MAC address is retrieved, a Layer 3 table lookup is triggered. If there is a hit on a router MAC address in the L2 table, the packet can be forwarded to the result of the L3 table lookup after rewriting the L2 header to point to the next hop MAC. If the destination port is an extended port 236, then the additional port extender tag encapsulation should be added to the routed packet. If the destination port is an access port 238, the routed packet can be sent as a native packet (without a port extender tag). An ACL entry may be used to redirect all packets that have undergone L3 table lookup that has resulted in L3 table miss. The ACL entry would redirect the packet to the controlling bridge with the appropriate header encapsulation (SRC=external extended port; DST=0).

Figure 4A:
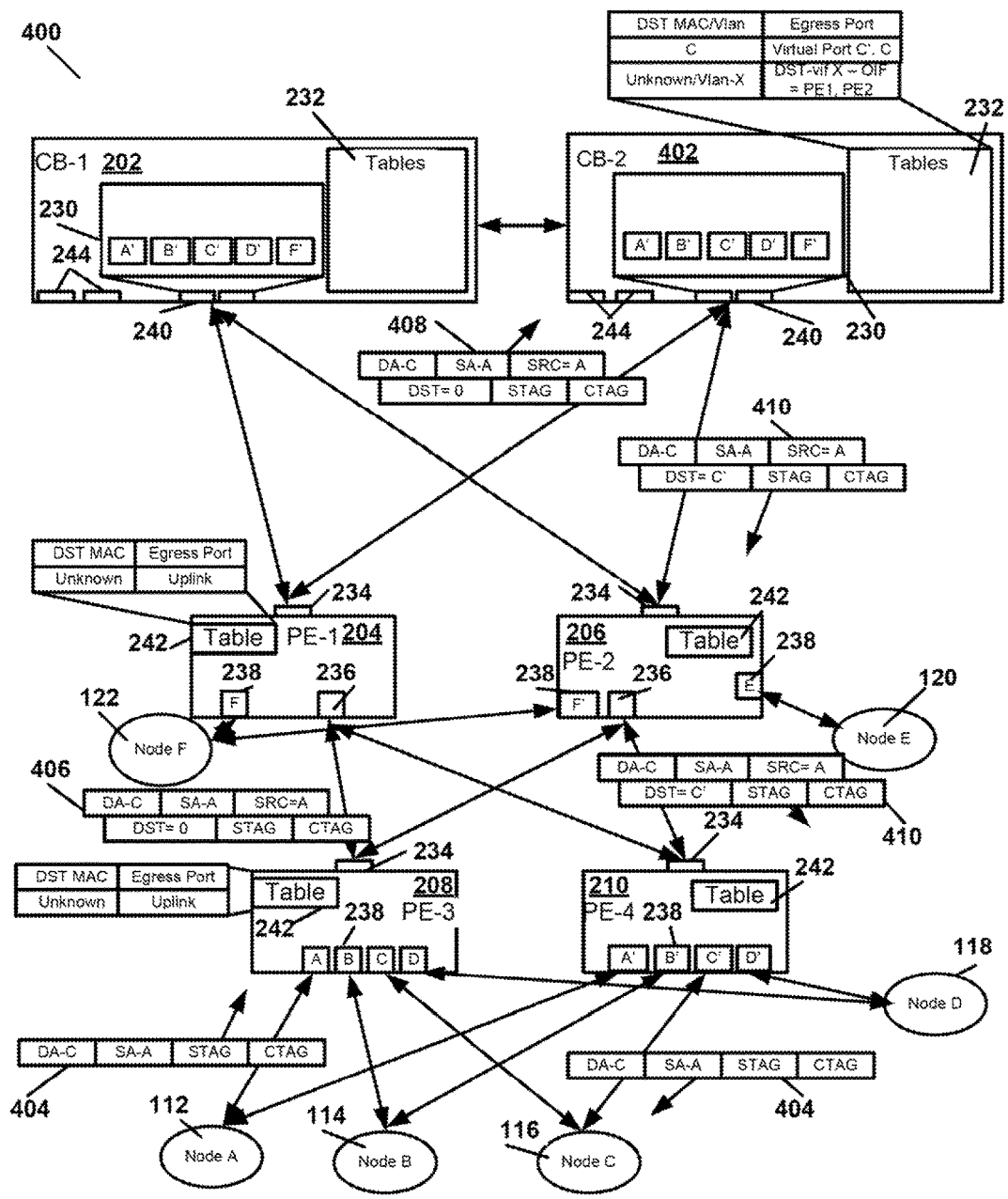
FIGS. 4A and 4B illustrate operation of an example port extender topology according to some embodiments of the present invention.

FIG. 4A illustrates a topology 400 according to some embodiments of the present invention. Topology 400 as illustrated in FIG. 4 is similar to topology 200 illustrated in FIGS. 2, 3A, 3B, and 3C with the addition of a second controlling bridge and is presented to illustrate multi-pathing according to some embodiments of the present invention and flooding according to some embodiments of the present invention. As shown in FIG. 4, topology 400 includes controlling bridge 202 coupled to controlling bridge 402. Controlling bridge 402 can be similarly constructed to controlling bridge 202 and includes tables 232, ports 240, and internal extended ports 230. As is further illustrated, internal extended ports 230 of controlling bridge 202 and controlling bridge 402 both include, once topology 400 is instantiated, extended ports A, B, C, D, E, F, A', B', C', D', and F'. Controlling bridge 202 and controlling bridge 402 can be coupled through an interchasis link between chassis port 420 on controlling bridge 202 and chassis port 422 on controlling bridge 402. In some embodiments, the link between chassis port 420 and chassis port 422, for example, can be an ISL link or an interchasis link, to exchange information for tables 232 and to exchange packets. As discussed above, during instantiation ACL and QoS polices for each of the extended ports can be downloaded to the associated port extenders.

On the link between chassis port 420 and chassis port 422, packets that either originated from a port extender on the peer bridge or may have originated from a regular access port or any other type of port can be received. If originated from an access port or any other port other than a cascade port, the packet will not have a tag. If the packet is received from a cascade port from a port extender, the packet will have a tag identifying that originating port. Because the controlling bridges share tables 232, they will know that the source is set and the destination is set so that the receiving controlling bridge can direct the packet to the correct egress port. If the destination DST is not set, the packet can be stripped and forwarding as a regular packet.

As is illustrated in FIG. 4A, ports 240 of both controlling bridge 202 and controlling bridge 402 are coupled to uplink ports 234 of each of port extenders 204 and 206. Consequently, controlling bridge 202 can exchange packets with both of port extenders 204 and 206 and controlling bridge 402 can exchange packets with both of port extenders 204 and 206.

As is further shown in FIG. 4A, access ports 238 of port extender 204 includes extended port F while access ports 238 of port extender 206 includes extended ports F' and E. Both extended port F and extended port F' are connected to Node F 122. Extended port E is connected to Node E 120. Nodes can have any number of connections to port extenders corresponding to any number of extended ports.

As additionally illustrated in FIG. 4A, cascade ports 236 of port extender 204 is connected to uplink ports 234 of both port extenders 208 and 210. Additionally, cascade ports 236 of port extender 206 is connected to uplink ports 234 of port extender 210. Therefore, packets can be transferred between port extender 208 and either of port extenders 204 and 206 and between port extender 210 and either of port extenders 204 and 206. As is further illustrated in FIG. 4A, extended ports 238 of port extender 208 includes extended ports A, B, C, and D while extended ports 238 of port extender 210 includes extended ports A', B', C', and D'. Extended ports A and A' are coupled to Node A 112; extended ports B and B' are coupled to Node B 114; extended ports C and C' are coupled to Node C 116; and extended ports D and D' are coupled to Node D 118. Therefore, topology 400 provides for multiple different pathways that a packet can be routed between Nodes A, B, C, D, E, and F and controlling bridges 202 and 402. Additionally, in topology 400 multipathing can be accomplished both at the level of controlling bridges 202 and 402 and at the level of port extenders 204 and 206. Furthermore, as discussed above with respect to FIGS. 2, 3A, 3B, and 3C, local switching can be performed for unicast packets at the level of port extenders 208 and 210 as well as at port extenders 204 and 206. All multicast or unknown unicast packets are forwarded to one of controlling bridges 202 and 402 for processing. Packets ingressing on port extenders 204, 206, 208, and 210 may be processed as in any conventional port extender.

As discussed above, all port extenders 204, 206, 208, and 210 execute a discovery protocol on each uplink port 234 connected to the port extender. If the uplink ports are grouped into a Link Aggregation Group (LAG), the port extender discovery protocol can be run on each LAG member connected to the uplink port 234. Similarly, each port extender reports all discovered downstream port extenders to their upstream port extenders. For example, port extender 208 reports extended ports A, B, C, and D on access ports 238 to port extender 204 and to port extender 206. Port extender 210 reports extended ports A', B', C', and D' on access ports 238 to port extender 204 and to port extender 208. Port extender 204 reports its connections to its connections to extended ports A, B, C, and D through cascade ports 236 on access ports 238 of port extender 208, to extended ports A', B', C', and D' through cascade ports 236 on access ports 238 of port extender 210 to controlling bridge 202 and controlling bridge 402. Each controlling bridge or port extender identifies themselves through the discovery protocol as a controlling bridge or a port extender based on their capabilities. Each controlling bridge 202 and 402 and each port extender 204, 206, 208, and 210 has a unique identifier (e.g. system MAC address or other identifier).

Each controlling bridge exchanges their connectivity to port extenders discovered by them with other controlling bridges so that every controlling bridge can build the same link state database of the topology. As illustrated in FIG. 4A, controlling bridge 202 and controlling bridge 402 exchange their connectivity information to port extenders 204, 206, 208, and 210, the configuration of extended ports 238 on each of port extenders 204, 206, 208, and 210, the instantiated links to extended ports related to the extended ports 238 on each of port extenders 204, 206, 208, and 210, and the configuration of cascade ports 236 on each of port extenders 204 and 206 and their connections to port extenders 208 and 210. Therefore, each controlling bridge can build the same link state database in tables 232. Further, each controlling bridge exchanges the set of extended ports instantiated on them with the other controlling bridges. Further ACL and QoS policies for each of the extended ports can be downloaded from the controlling bridge to the associated port extender.

As part of the discovery process, the group of controlling bridges in a topology elect a primary controlling bridge. The association of an edge node to a multicast group or a particular VLAN can be learned through configuration or a control plane protocol like IGMP and synchronized among all controlling bridges in a particular topology. On a controlling bridge, extended ports can be associated with a LAG (i.e., can be aggregated together to form part of a LAG). The controlling bridge can select any of the extended ports in the LAG as the resolved LAG member and forward packets to that destination extended port. For example, extended ports A and A' can be members of the same LAG. Similarly, extended ports B and B', C and C', D and D', and F and F' can be parts of LAGs recognized by the controlling bridges. Aggregating the extended ports as suggested above allows for the multipathing through topology 400 without the pruning of redundant paths that may otherwise be required. If a controlling bridge does not support extended port LAG, then the controlling bridge can resort to load balancing at the controlling plane level by learning select MAC addresses to each extended port member of the LAG.

As illustrated in FIG. 4A, tables 232 of each of controlling bridges 202 include the L2 forwarding tables and the ACL and QoS policies appropriate for topology 400. FIG. 4A further illustrates transmission of a packet 404 from Node A 112 to controlling bridge 402 on its way to its destination, Node C 116.

As an example, as shown in FIG. 4A packet 404 is received at port 238 (extended port A) of port extender 208. Packet 404 includes SA=A and DA=C. As discussed above, if there is a miss on either of SA or DA, then port extender 208 is forwarded through uplink port 234. Therefore, If, in port extender 208, table 242 included both SA=A and DA=C, then port extender 208 can internally switch packet 404 to extended port C for transmission to its destination Node C 116. However, in this example after an L2 table lookup in table 242 reveals that neither the source address SA=A nor the destination address DA=C are programmed in it, then port extender 208 supplies the port extender tags and sets SRC=A and DST=0 to form packet 406. Packet 406 is sent to cascade port 236 of port extender 204. In general, if packet 406 is received at cascade port 236 of a port extender it may be directed to uplink port 234. In some embodiments, the port extender may check table 242. In this example, table 242 of port extender 204 also does not have programmed in its tables SA=A or DA=C and so port extender 204 forwards packet 406 to controlling bridge 402.

As shown in FIG. 4A, table 232 of controlling bridge 402 does not include SA=A. Therefore, controlling bridge 402 learns SA-A and associates the MAC address A with extended port A and its path through the port extenders. Controlling bridge 402 then updates table 242 of port extender 208 and in some cases tables 242 of port extenders 204 and 206 with the appropriate MAC address and extended ports A or A' as appropriate for routes that lead to Node A 112.

In this particular example, MAC address C is known in table 232 and is associated with extended ports C' and C. In this example, controlling bridge 402 sets DST to C' to form packet 410, which is then sent to uplink port 234 of port extender 206. A packet that arrives at an uplink port 234 that does not include the port extender tag (e.g. SRC and DST fields), or if the DST=0 within the port extender TAG, is dropped. Once packet 410 is received, port extender 206 performs a lookup in table 242 utilizing DST=C'. Packet 410 is then forward to port extender 210, where ports 238 include extended port C'. Port extender 210 then removes the port extender tag and delivers packet 404 to its destination, Node C 116.

However, if MAC address C is not known in table 232, then controlling bridge 402 may flood the packet on the topology 400 in order to insure that packet 404 arrives at Node C, which is not yet known. Flooding can be constrained to an appropriate subset of external extended ports by appropriately setting the DST to indicate the group of ports to which the packet is to be delivered. While flooding, source suppression may be utilized to prevent resending packet 404 back to its source.

Figure 4B:
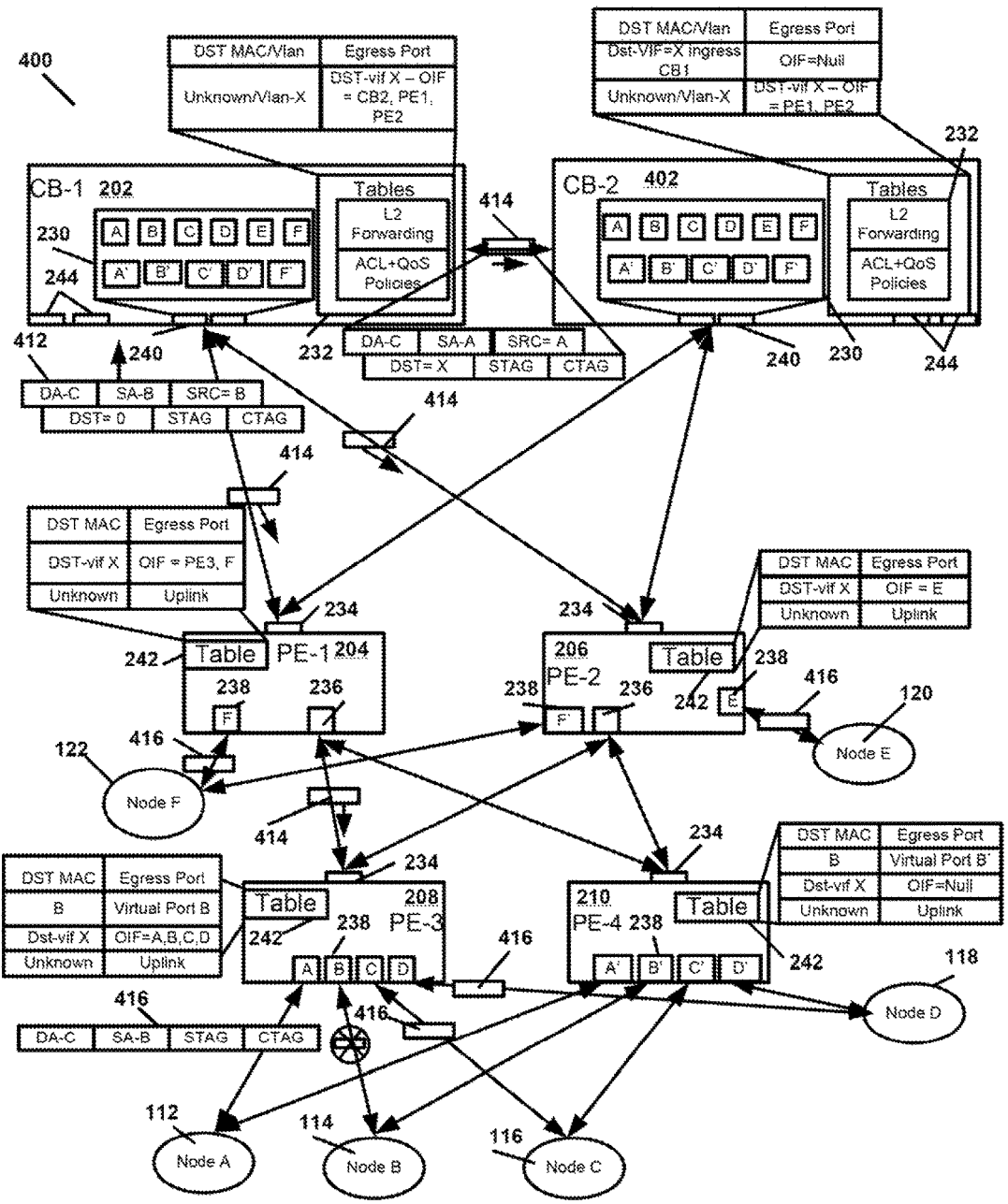

FIG. 4B illustrates an example where packet 412 is forwarded to controlling bridge 202. Packet 412 originated at Node B 114 into port extender 208 and has been uplinked to controlling bridge 202 (CB1). FIG. 4B illustrates particular entries into tables 242 of each of port extenders 204, 206, 208, and 210. FIG. 4B also illustrates particular entries into tables 232 of controlling bridge 202 (CB1) and controlling bridge 402 (CB2). These entries can be provided in tables 232 of controlling bridge 202 and controlling bridge 402 and written into tables 242 of port extenders 204, 206, 208, and 210 during the discovery period. As is further discussed below, a path is provided to flood an unknown destination packet to all extended ports 238 of port extenders 204, 206, 208, and 210 without sending a packet twice to any one of extended ports 238 of port extenders 204, 206, 208, and 210 through the multi-pathing topology 400 illustrated in FIG. 4B. In some embodiments, source suppression can also be utilized to avoid sending a packet back to its source.

As shown in FIG. 4B, packet 412 is received at ports 240 of controlling bridge 202. In controlling bridge 202, if a packet is received with a port extender tag, which is the case when received at ports 240 that are connected to port extenders or received from other controlling bridges in topology 400, the controlling bridge 202 will perform an L2 lookup utilizing the DA and SA fields. As discussed above, if there is a miss on the SA field, then controlling bridge 202 will learn the SA MAC address and forward the appropriate information to the access port extender (in this example, port extender 208). As shown in FIG. 4B, table 242 already includes an entry for the MAC address A and therefore that MAC address has already been learned by topology 400. In general, when a new MAC address is learned on a extended port, the controlling bridge adds the MAC address to the corresponding port extenders associated with that address, along with all other controlling bridges in topology 400. If the MAC is learned on an extended port LAG that is spread across multiple port extenders, then the controlling bridge updates all of those port extenders.

If there is also a hit on the DA MAC address and the destination is local, i.e. directed to one of access ports 244 and not through extended ports 240, then controlling bridge 202 will remove the port extender tag and forward the original packet to the appropriate one of access ports 244. Otherwise, controlling bridge 202 will appropriately alter the DST field in the port extender tag to reflect the extended port of its destination and forward the packet through ports 240 to the appropriate port extender.

If there is a miss on the DA MAC address, then controlling bridge 202 floods topology 400 with the packet. On local ports, controlling bridge 202 removes the port extender tag and sends the packet to all local access ports 244. On extended ports 240, controlling bridge 202 sets DST to the flooding multicast group, designated as X in the example illustrated in FIG. 4B, and sends the packet according to the egress ports entry for the multicast group X.

If the ingress packet has a port extender tag and DST is not 0, then controlling bridge 202 performs an L2 lookup and forwards the packet accordingly. If the egress packet is to include a port extender tag, then forward the packet with the port extender tag that was in the ingress packet. If the egress port is an access port (not an extended port 240), then the port extender tag is stripped in controlling bridge 202 before forwarding to the indicated access port. If DST indicates a multicast group, then forward the packet based on the output interface list updated by the primary controlling bridge.

If the ingress packet is received through one of access ports 244 and does not include a port extender tag, then the controlling bridge performs an L2 table lookup utilizing the SA and DA MAC address. If there is a DA hit, the controlling bridge either forwards it to the indicated one of access ports 244 or adds a port extender tag and forwards it to the indicated extended port through extended ports 240. As discussed above, the port extender tag includes SRC set to the ingress port and DST set to the extended port of the final destination.

If there is no DA hit during the L2 lookup, then the controlling bridge floods the packet on all of the ports as discussed above. On access ports 244, no port extender tag is used. On extended ports 240, a port extender tag is included with SRC set to the ingress port and DST set to the flooding multicast group. If a new MAC address is learned in the process, the controlling bridge updates all peer controlling bridges with the new association of MAC and extended port.

As discussed above, source suppression may be utilized when the controlling bridge floods packets on the topology 400. If the ingress packet did not include a port extender tag, then packets directed to the SA are suppressed. If the ingress packet includes a port extender tag, then packets directed to SRC are suppressed. Source suppression can be performed in the port extender to which the external extended port indicated by the SRC is attached.

In the example illustrated in FIG. 4B, ingress packet 412 is received at extended port 240 of controlling bridge 202 and includes a port extender tag with SRC=B and DST=0. As discussed above, controlling bridge 202 performs an L2 lookup and does not find the destination MAC C. Therefore, as indicated in table 232 of controlling bridge 202, controlling bridge 202 floods the packet on topology 400. Accordingly, controlling bridge 202 sets DST=X to create packet 414 and forwards packet 414 to controlling bridge 402, port extender 204 and port extender 206. Controlling bridge 402 receives packet 414 and performs an L2 lookup in table 232 of controlling bridge 402 based on DST. In controlling bridge 402, since packet 414 is received from controlling bridge 202 (CB1) and DST is set to multicast group X, the packet is dropped.

Packet 414 is also forwarded to both port extenders 204 and 206. Port extender 206 performs an L2 lookup in table 242 of port extender 206 and finds that the egress port for the multicast group X is output interface list which includes external extended port E. Port extender 206 then removes the port extender tag and forwards the resulting packet 416 through the port 238 corresponding to extended port E to Node E 120. Port extender 206 does not forward packet 414 to any other ports.

Port extender 204 also performs an PE lookup on DST. Table 242 of port extender 204 indicates that for DST=X, the output interface list is PE3 and F. Therefore, port extender 204 removes the port extender tag and forwards packet 416 to extended port F and therefore to Node F 122. Port extender 204 also forwards packet 414 to port extender 208.

Port extender 208 receives packet 414 and performs an L2 lookup. The multicast address DST=X corresponds with OIF of A, B, C, and D in table 242 of port extender 208. However, port extender 208 also checks the SRC address, which is set to B, and performs a source suppression step. Therefore, port extender 208 removes the port extender tag from packet 414 and forwards packet 416 to extended ports A, C, and D, where packet 416 arrives at Node A 112, Node C 116, and Node D 118. As shown in FIG. 4C, packet 416 is not sent to Node B 114, its source.

In some embodiments, multipathing can be accomplished by both port extenders and the controlling bridges. Additionally, both access port extenders (e.g., port extenders 208 and 210) and transit port extenders (e.g., port extenders 204 and 206) can perform local switching for unicast packets. Multicast and unknown unicast packets are still forward to one of the controlling bridges (e.g., controlling bridge 202 and controlling bridge 402) and multicast replication is accomplished at the appropriate controlling bridge.

As discussed above, all port extenders run a discovery protocol on each uplink port connected to upstream port extenders or controlling bridges. In the event that the uplink ports are grouped into a LAG, the port extender discovery protocol is still run on each LAG member of the uplink port.

Similarly, all port extenders report all discovered downstream port extenders to their upstream port extenders. Each controlling bridge and port extender identifies itself over the discovery protocol as a controlling bridge or a port extender based on their capabilities. Further, each of the controlling bridges and port extenders have a unique identifier (for example a system MAC address) to distinguish them from each other.

The controlling bridges exchange connectivity to port extenders discovered by them so that every controlling bridge can build the same link state database of the topology. All controlling bridges exchange the set of extended ports instantiated on them with other controlling bridges. As part of the discovery process, the controlling bridges elect a primary controlling bridge. As discussed above, the association of an edge node to a multicast group or a VLAN can be learned through configuration or a controlling plane protocol like IGMP and is synchronized among all controlling bridges.

In some embodiments, extended ports can be members of a LAG. The controlling bridge can select any of the extended ports as the resolved LAG member and forward packets to that destination extended port. If the controlling bridge does not support LAGs for extended ports, then the controlling bridge can resort to load balancing at the controlling plane level by learning select MAC addresses to each extended port member of the LAG.

Figure 5A:
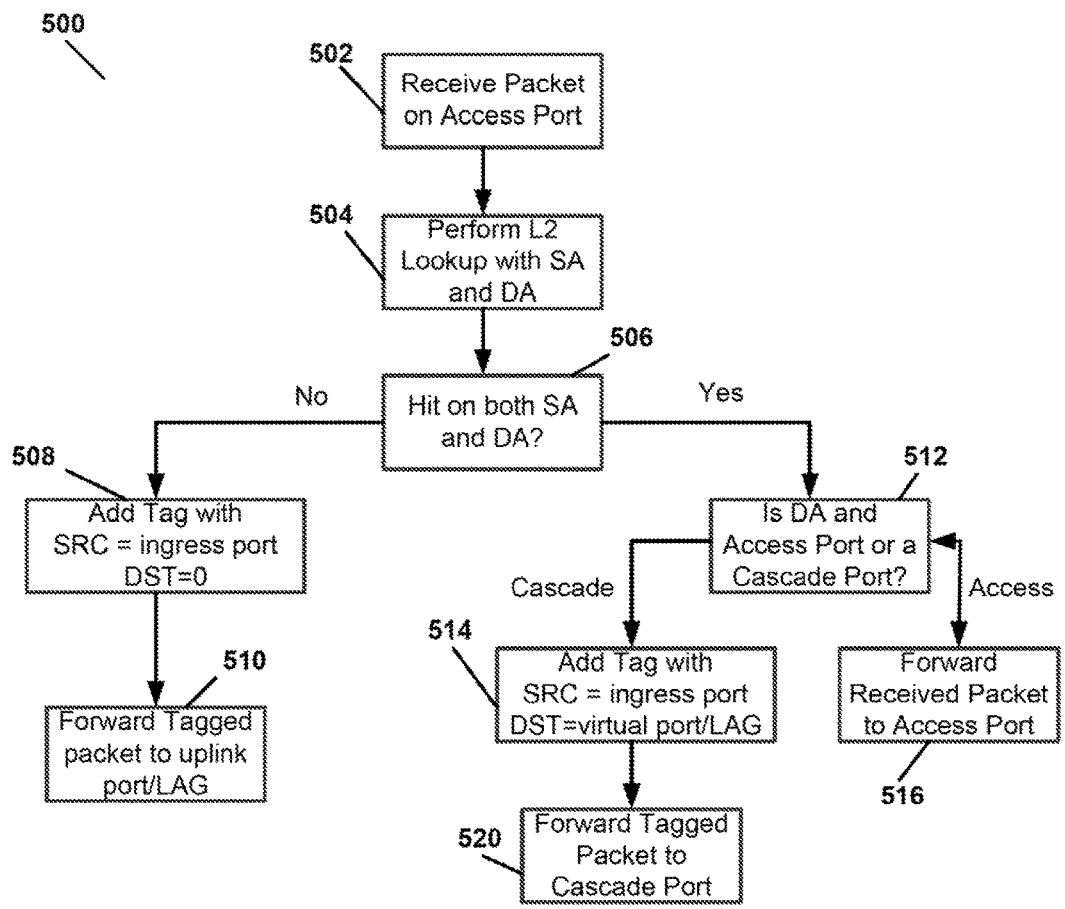
FIGS. 5A, 5B, and 5C illustrate procedures for operation of a port extender according to some embodiments of the present invention.

FIG. 5A illustrates a procedure 500 implemented on a port extender such as one of port extenders 204, 206, 208, or 210 when a packet is received on an access port 238. In step 502, a packet is received on an access port 238. In step 504, an L2 lookup is performed utilizing SA and DA. In step 506, if there is a hit on both SA and DA procedure 506 proceeds to step 512, otherwise procedure 506 proceeds to step 508. In step 512, procedure 506 determines whether the MAC DA is local and through an access port 238 or is reachable through a downstream PE through a cascade port 236. If the destination is local, the procedure 500 proceeds to step 516 and forwards the received packet to the indicated destination access port 238. If the destination is through a downstream PE, then procedure 500 proceeds to step 514 where a port extender tag is added with SRC=ingress port and DST=extended port/LAG and then to step 520 where the tagged packet is forwarded through the cascade port 236.

If, in step 506, there is a miss on either the SA or the DA, then procedure 500 proceeds to step 508. In step 508, a port extender tag is added to the packet with SRC=ingress port and DST=0. Procedure 500 then proceeds to step 510 where the tagged packet is forward to the uplink port/LAG 234.

Figure 5B:
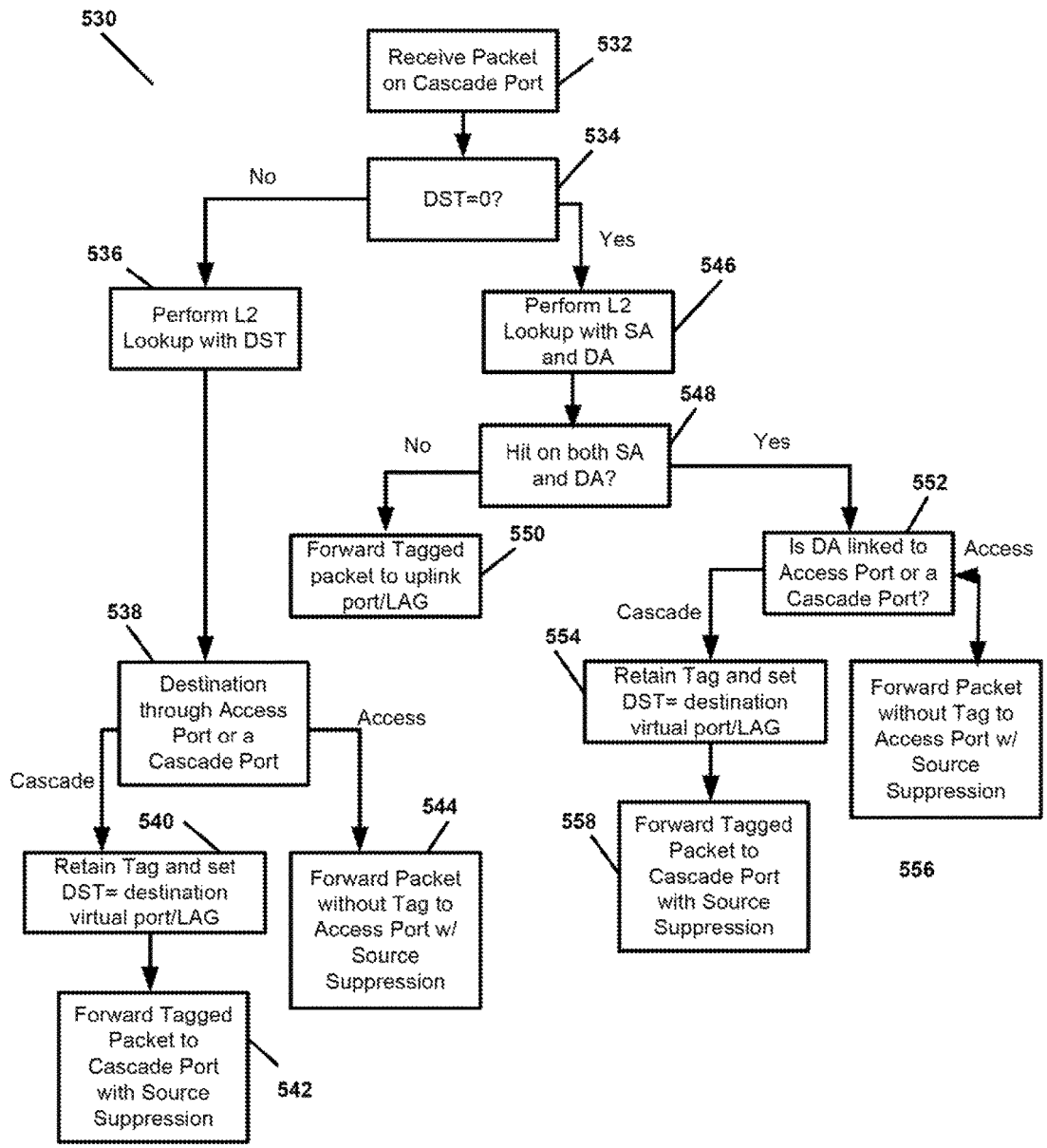

FIG. 5B illustrates a procedure 530 that is performed on a port extender when a packet ingresses through a cascade port 236. In step 532, a packet is received through a cascade port 236 of a port extender. Because the packet is arriving from another port extender, it includes a port extender tag with a SRC and DST field. In step 534, procedure 530 determines whether or not DST is 0. DST may be non-zero in this case, for example, if the packet is received through a link between port extenders where the packet is received from a controlling bridge. If DST is 0, then procedure 530 proceeds to step 546. In step 546, an L2 lookup is performed with SA and DA. If there is a miss on either SA or DA, then procedure performs step 550 and forwards the tagged packet to uplink port/LAG 234. If there is a hit on both of SA and DA, the procedure 530 proceeds to step 552. In step 552, procedure 530 determines whether the DA is linked to an access port 238 or a cascade port 236. If the DA is linked to an access port 238, then procedure 530 removes the port extender tag and forwards the packet to the access port 238. In some embodiments, source suppression may be utilized to avoid forwarding a packet back to its destination SA. Source suppression can be performed utilizing the SRC field.

From step 552, if the DA is linked through a cascade port 236 the procedure 530 performs step 554 and 558. In step 554, the DST field of the port extender tag is set to DST=destination extended port/LAG. In step 558, the packet with the updated port extender tag is forwarded to the cascade port 236. Again, source suppression may be performed utilizing the SRC field.

In step 534, if DST is not 0, then procedure 530 performs a PE lookup on DST in step 536. In step 538, procedure 530 determines whether the destination is through an access port 238 or a cascade port 236. If an access port 238, then procedure 530 removes the port extender tag and forwards the resulting packet to the access port 238 in step 544. If a cascade port 236, then procedure 530 executes steps 540 and 542. In step 540, the DST is set to the destination extended port/LAG and in step 542 the tagged packet is forwarded to the cascade port 236. Source suppression may be performed in both steps 542 and 544.

Figure 5C:
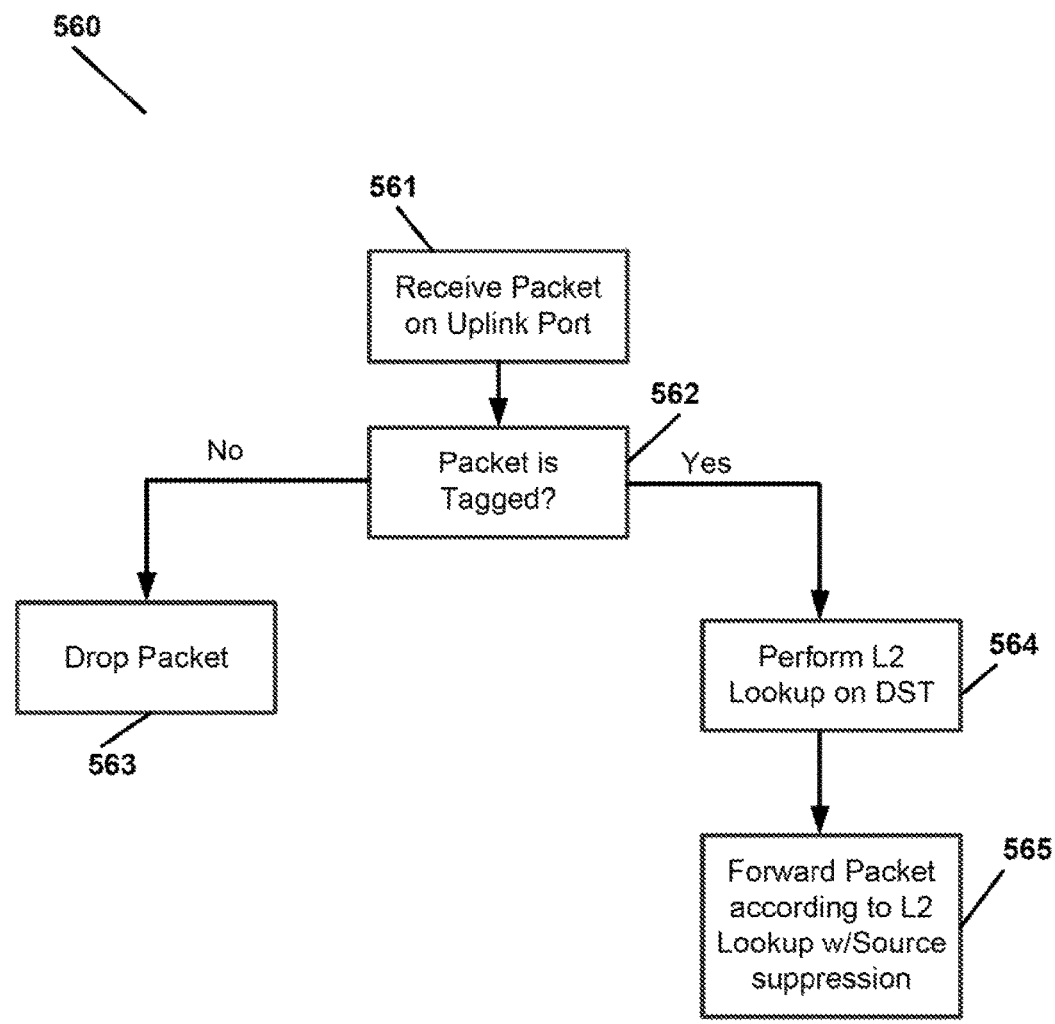

FIG. 5C illustrates a procedure 560 where a packet is received in an uplink port 234. In step 561, the packet is received at uplink port 234 of a port extender. In step 562, procedure 560 determines whether the packet includes a port extender tag. If not, then procedure 560 proceeds to step 563 where the packet is dropped. If the port extender tag is present, then procedure 560 proceeds to step 564 where a PE lookup is performed on DST. In step 565, procedure 560 forwards the packet according to the result of the PE lookup. In some embodiments, source suppression may be utilized in step 565.

Figure 5D:
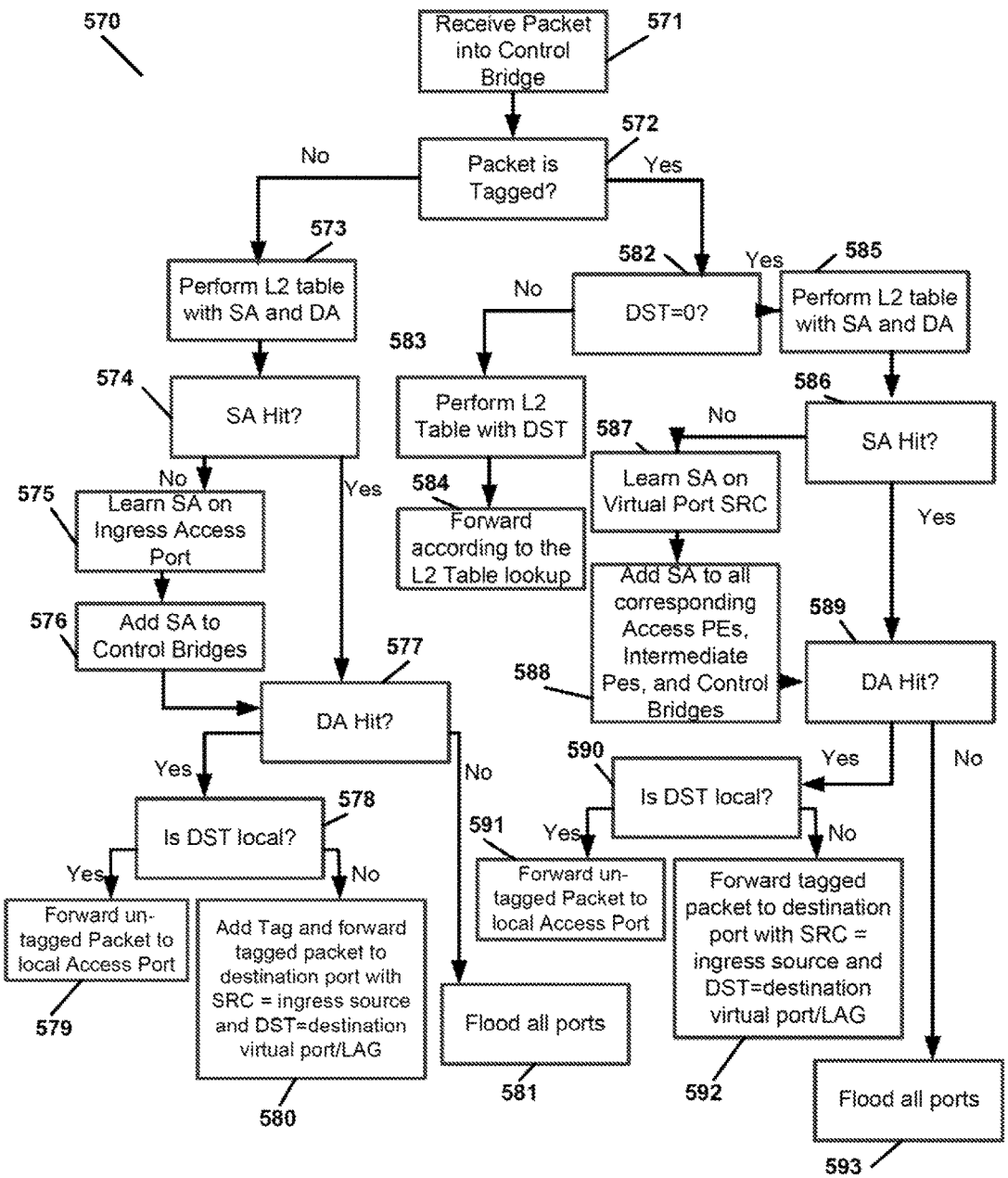
FIG. 5D illustrates procedures for operation of a controlling bridge according to some embodiments of the present invention.

FIG. 5D illustrates a procedure 570 that is performed on a controlling bridge according to some embodiments of the present invention. In step 571 of procedure 570, a packet is received into a controlling bridge 571. The packet is either native (i.e., received on an access port 244 of the controlling bridge) or it was forwarded by another controlling bridge or a port extender on extender ports 240. In step 572, procedure 570 determines whether the packet includes a port extender tag or not. If the packet includes a port extender tag, the procedure 570 proceeds to step 582. In step 582, then procedure 570 determines whether DST=0. If DST is not 0, the procedure performs steps 583 and 584. In step 583 a PE lookup is performed utilizing DST. In step 584, the packed is forwarded according to the results of the PE table lookup performed in step 583.

If in step 582 DST=0, the procedure 570 proceeds to step 585. In step 585, an L2 table lookup is performed utilizing SA and DA. In step 586, procedure 570 determines whether there was a hit on SA. If there is no hit on SA, the procedure 570 executes steps 587 and 588. In step 587, the controlling bridge learns the MAC SA on extended port SRC. In step 588, controlling bridge adds the learned SA entry to all corresponding access PEs and intermediate PEs associated with the extended port SRC. The entry is also programmed via the control plane in all other controlling bridges in the topology.

If there was a hit on SA in step 586, after the completion of step 588, or concurrently with the execution of steps 587 and 588, the procedure 570 proceeds to step 589 where it is determined whether or not there was a hit on DA. If there was no hit on DA, then procedure 570 proceeds to flood the packet on all ports in step 593. During flooding, as discussed above, source suppression can be utilized.

If there was a hit on the DA, then procedure 570 proceeds to step 590. In step 590, procedure 570 determines whether the destination is local (i.e. one of access ports 244) or accessed through one of extended ports 240. If the destination is local, then the controlling bridge removes the port extender tag and forwards the untagged packet to the indicated access port 244 in step 591. If not, then in step 592 the controlling bridge forwards the tagged packet to the destination with SRC set to the ingress port and DST set to the destination extended port/LAG.

If, in step 572, the packet is not tagged, then procedure 570 performs an L2 lookup utilizing SA and DA in step 573. In step 574, procedure 570 determines whether there was a hit on SA or not. If not, the procedure 570 executes step 575 and 576. In step 575, the controlling bridge learns SA on ingress access port and in step 576 the controlling bridge updates all of the other controlling bridges in the topology to add SA. If there was a hit on SA, or after steps 575 and 576 are executed, or concurrently with the execution of steps 575 and 576, procedure 570 proceeds to step 577 to determine whether there was a hit on DA. If there was no hit on DA, then procedure 570 floods the packet on all ports in step 581. If in step 577 it is determined that there was a hit on DA, then procedure 570 determines whether DST is local (e.g. through an access port 244) or accessed through an extended port 240. If local, then procedure 570 executes step 579 and forwards the untagged (no port extender tag) packet to the appropriate access port 244. If reachable through an extended port, then procedure 570 executes step 580 to add a port extender tag setting SRC to the ingress port and DST to the destination extended port/LAG and forwards the packet to an extended port 240.

Figure 6A:
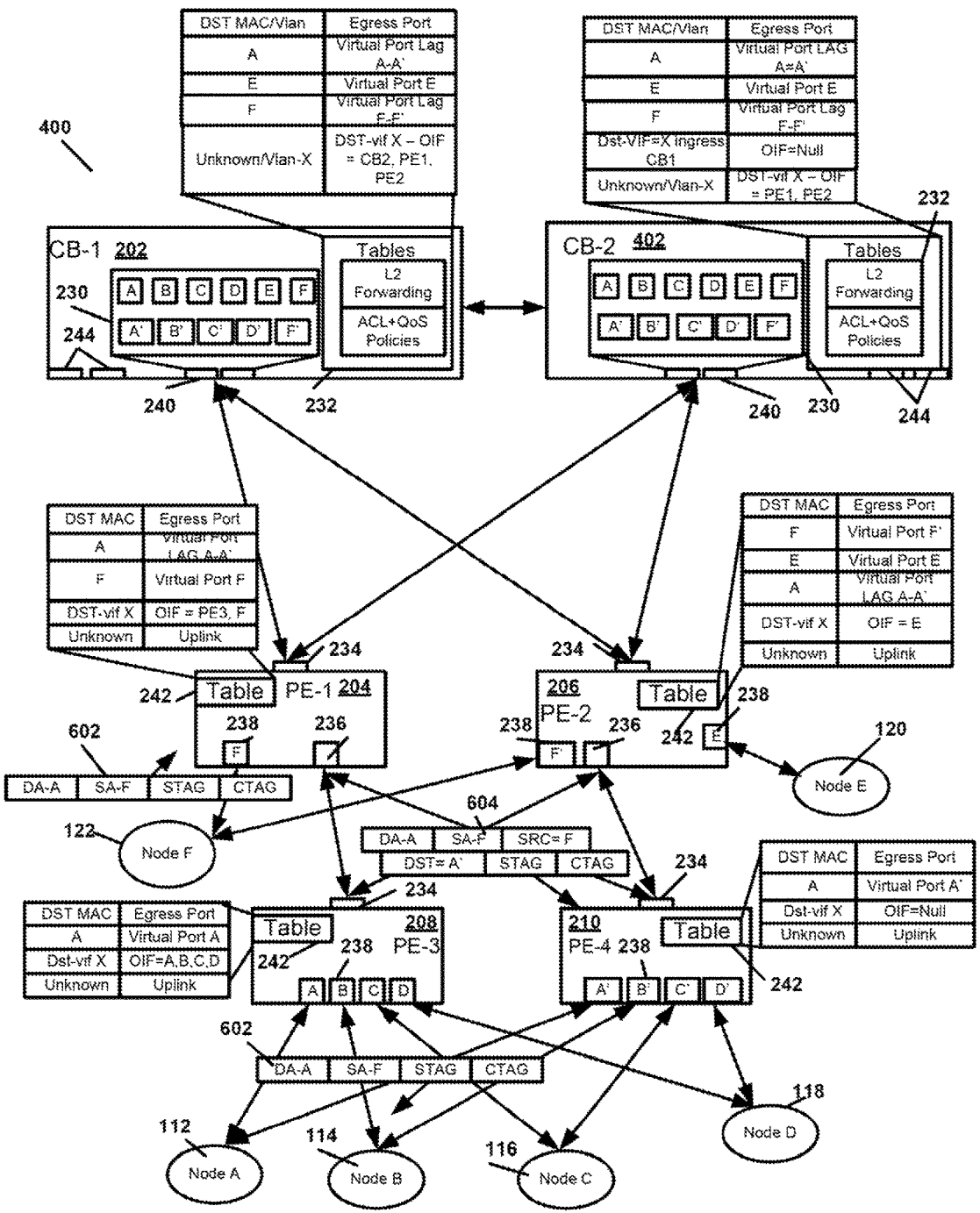
FIGS. 6A, 6B, 6C, and 6D illustrate example aspects of a port extender topology according to some embodiments of the present invention.

FIGS. 6A, 6B, 6C, and 6D illustrate certain aspects of procedures 500, 530, 560, and 570 illustrates in FIGS. 5A, 5B, 5C, and 5D, respectively. As shown in tables 232 of controlling bridges 202 and 402 in topology 400 illustrated in FIG. 5A, MAC address A, E, and F have been learned. Tables 242 of port extenders 20204, 206, 208, and 210 have been updated by controlling bridge 202 or 402. As illustrated in FIG. 6A, in topology 400 controlling bridge 202 is the primary CB. As one skilled in the art should recognize, the examples illustrated in FIGS. 6A, 6B, 6C, and 6D are not exhaustive of all circumstances illustrated in FIGS. 5A, 5B, 5C, and 5D. Instead, FIGS. 6A, 6B, 6C, and 6D are offered for illustrative purposes only.

FIG. 6A further illustrates topology 400. In FIG. 6A, tables 232 of controlling bridges 202 and 402 include data for MAC address A, E, and F. Further, tables 242 of port extenders 204, 206, 208, and 210 have been populated to reflect the learned addresses shown in controlling bridges 202 and 402.

FIG. 6A illustrates an example where a packet 602 is sourced at Node F 122 with a destination to Node A 112. As shown in FIG. 6A, packet 602 includes DA=A and SA=F and arrives at extended port F on an access port 238 of port extender 204. Since both SA and DA are found in table 242 of port extender 204, then port extender 204 proceeds to forward a tagged packet to Node A 112. As shown in FIG. 6A, port extender 204 provides a port extender tag with DST=A' and SRC=F and forwards the resulting packet 604 through a cascade port 236 to an uplink port 234 of port extender 210. Port Extender 210 then receives packet 604, performs a PE lookup on table 242 of port extender 210, removes the port extender tag to retrieve the original packet 602, and forwards packet 602 through extended port A' to Node A 112. It should be noted that in port 204, the choice of forwarding a tagged packet to port extender 208 and port extender 210 is the result of a hashing algorithm performed by port extender 204 on various fields in the packet header.

Figure 6B:
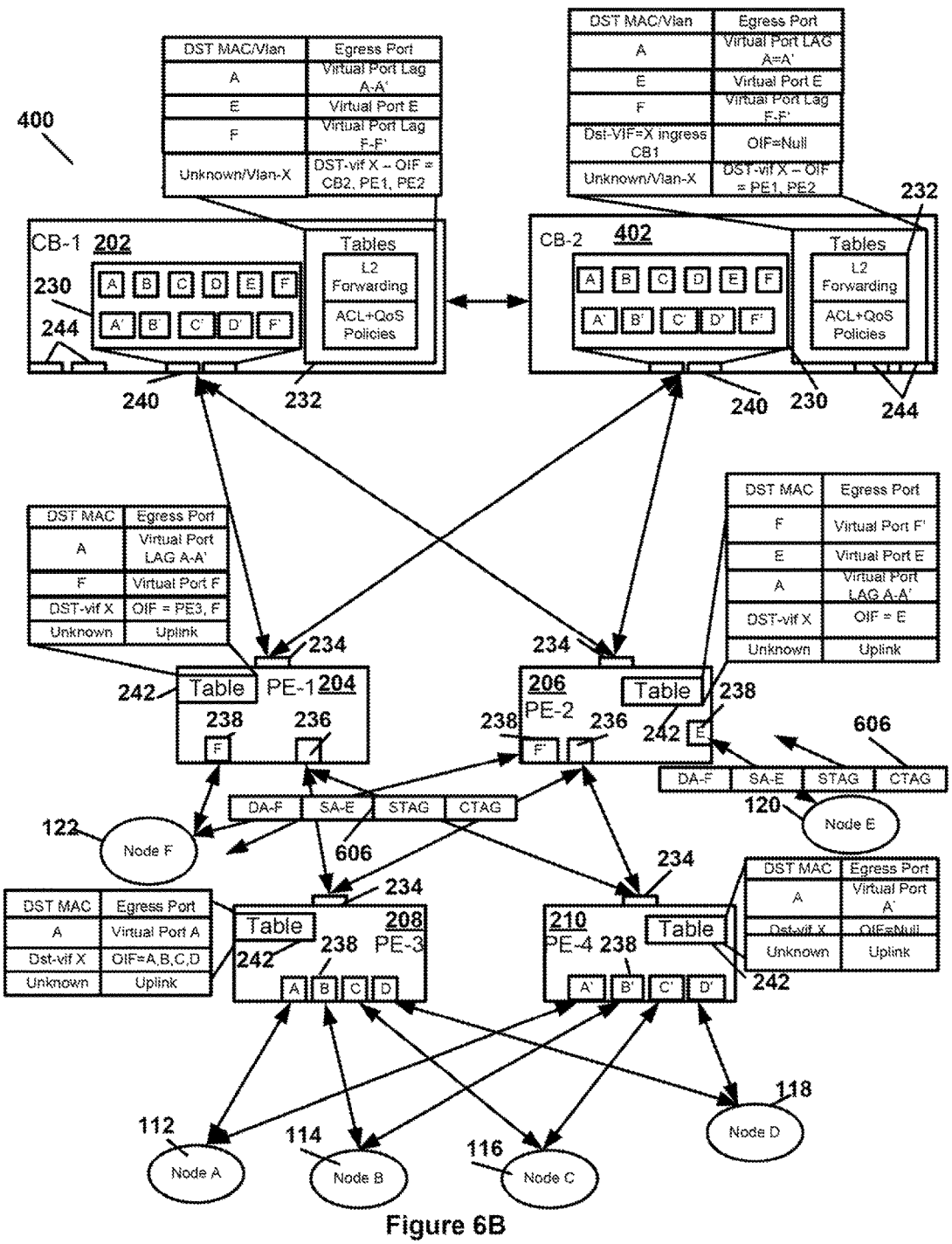

FIG. 6B illustrates transmission of a packet 606 between Node E 120 and Node F 122. As illustrated in FIG. 6B, packet 606 is received in extended port E of access port 238 of port extender 206 with SA=E and DA=F. Port extender 206 performs an L2 lookup in table 242 of port extender 206 has a hit on both SA=E and DA=F. As a result, port extender 206 then forwards packet 606 through extended port F' on access port 238 of port extender 206 directly to Node F 122.

Figure 6C:
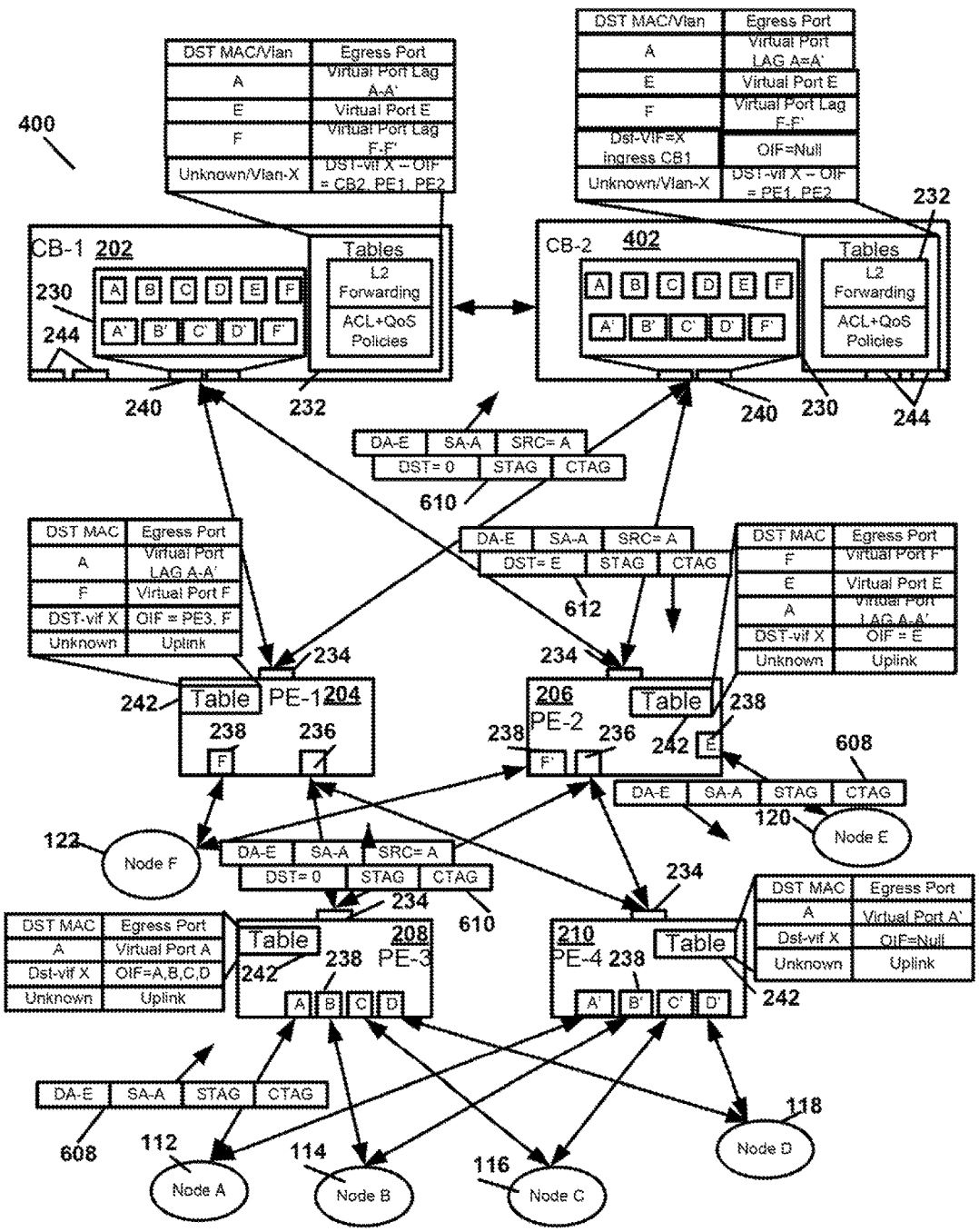

FIG. 6C illustrates transmission of a packet 608 between Node A 112 and Node E 120. As illustrated in FIG. 6C, packet 608 with SA=A and DA=E is received at Node A on an access port 238 of port extender 208. Since E is not included in table 242 of port extender 208, port extender 208 adds a port extender tag with SRC=A and DST=0 and forwards packet 610 through uplink 234 of port extender 208 to port extender 204. Again, since DA=E is unknown by port extender 204, port extender 204 forwards packet 610 through uplink 234 of port extender 204 to controlling bridge 402. Controlling bridge 402 performs an L2 lookup on table 232, sets DST=E and forwards packet 612 to port extender 206. Port extender 206 performs a PE lookup on table 242 of port extender 206, removes the port extender tag, and forwards packet 608 through extended port E to Node E 120. It is interesting to note that if packet 608 had been forwarded to port extender 210 and then to port extender 206, then port extender 206 would have performed a local switching to Node E 120 without involving either of controlling bridges 202 and 402.

Figure 6D:
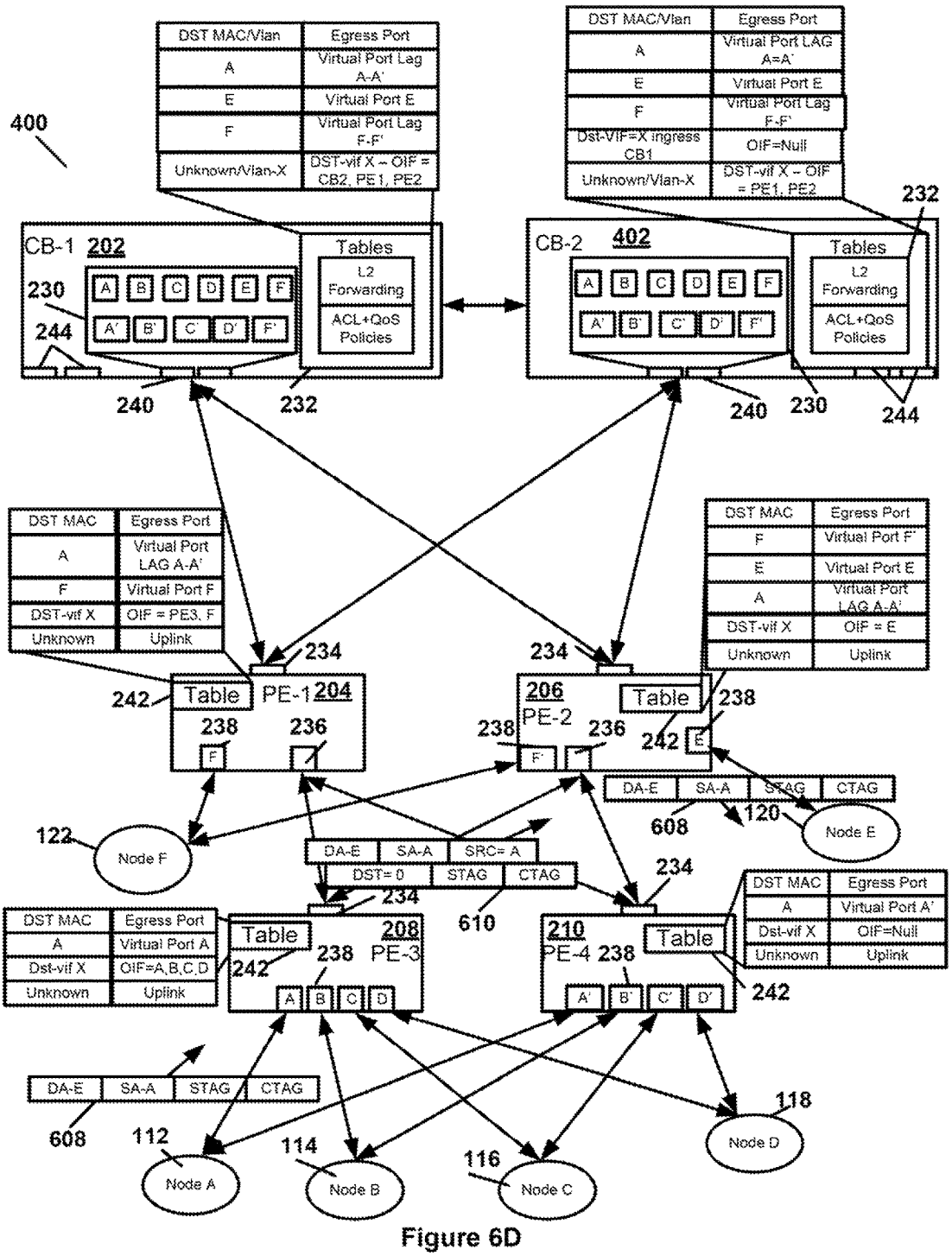

Additionally, as is illustrated in FIG. 6D, if port extender 208 had forwarded packet 610 to port extender 206 instead of port extender 204, then port extender 206 would have again performed a local switching to Node E 120 without involving either of controlling bridges 202 and 402. As illustrated in FIG. 6D, port extender 208 forwards packet 610 to port extender 206 instead of port extender 204. Port extender 206 then, finding both SA=A and DA=E in table 242, removes the port extender tag and forwards packet 608 to Node E 120.

If the DA has not yet been learned by controlling bridges 202 and 402, then controlling bridges 202 and 402 can flood the packet on all ports as is illustrated, for example, in FIG. 4B. If the SA has not been learned by controlling bridges 202 and 402, then controlling bridges 202 and 402 can learn the SA and update the port extenders as is illustrated, for example, in FIGS. 3A and 3B.

The above detailed description is provided to illustrate specific embodiments of the present invention and is not intended to be limiting. Numerous variations and modifications within the scope of the present invention are possible. The present invention is set forth in the following claims.

What is claimed is:

1. A port extender, comprising:
one or more access ports coupling the port extender to one or more nodes;
one or more cascade ports coupling the port extender to one or more downstream port extenders;
one or more uplink ports coupling the port extender to one or more upstream port extenders or a controlling bridge;
non-transitory memory storing instructions; and
one or more processors coupled to the non-transitory memory and configured to read the instructions from the non-transitory memory which when executed configure the port extender to perform operations comprising:
receiving a first packet on one of the access ports, the first packet including a source media access control (MAC) address and a destination MAC address;
determining whether the source MAC address is found in a lookup table;
determining whether the destination MAC address is found in the lookup table;
forwarding the first packet toward the destination MAC address in response to determining that both the source and destination MAC addresses are found in the lookup table; and
in response to determining that one or both of the source or destination MAC addresses is not found in the lookup table:
adding a first port extender tag to the first packet, the first port extender tag indicating to the controlling bridge that source address learning be performed on the first packet with the first port extender tag; and
forwarding the first packet with the first port extender tag toward the controlling bridge using only one of the uplink ports.

2. The port extender of claim 1, wherein the operations further comprise executing an access control logic (ACL) and quality of service (QoS) function.

3. The port extender of claim 2, wherein ACL and QoS policies for one or more extended ports associated with the access ports or the cascade ports are received from the controlling bridge and stored in a table in the non-transitory memory during an instantiation procedure.

4. The port extender of claim 1, wherein the operations further comprise local switching.

5. The port extender of claim 1, wherein the first port extender tag comprises:
a source identifier (SRC) field set to an extended port associated with the one of the access ports; and
a destination identifier (DST) field set to 0.

6. The port extender of claim 1, wherein the operations further comprise:
receiving a tagged packet on one of the cascade ports, the tagged packet including a second source MAC address and a second destination MAC address and a second port extender tag that includes a SRC and a DST field;
determining whether the second source MAC address is found in the lookup table;
determining whether the second destination MAC address is found in the lookup table;
setting the DST field to a virtual port to form a second packet and forwarding the second packet toward the second destination MAC address using one of the cascade ports when both the second source and second destination MAC addresses are found in the lookup table and the second destination MAC address is associated with a cascade port;
removing the second port extender tag to form a third packet and forwarding the third packet toward the second destination MAC address using one of the access ports when both the second source and second destination MAC addresses are found in the lookup table and the second destination MAC address is associated with one of the access ports; and
forwarding the tagged packet using only one of the uplink ports when one or both of the second source and second destination MAC addresses is not found in the lookup table.

7. A non-transitory machine readable medium having stored thereon machine readable instructions executable to configure a port extender to perform operations comprising:

receiving a first packet on an access port of the port extender, the first packet including a source media access control (MAC) address and a destination MAC address;

determining whether the source MAC address is found in a lookup table;

determining whether the destination MAC address is found in the lookup table;

forwarding the first packet toward the destination MAC address in response to determining that both the source and destination MAC addresses are found in the lookup table; and in response to determining that one or both of the source or destination MAC addresses is not found in the lookup table:

adding a first port extender tag to the first packet, the first port extender tag indicating to a controlling bridge that source address learning be performed on the first packet with the first port extender tag; and forwarding the first packet with the first port extender tag toward the controlling bridge using an uplink port, the uplink port coupling the port extender to an upstream port extender or a controlling bridge.

8. The non-transitory machine readable medium of claim 7, wherein the operations further comprise executing an access control logic (ACL) and quality of service (QoS) function.

9. The non-transitory machine readable medium of claim 8, wherein ACL and QoS policies for one or more extended ports of the port extender are received from the controlling bridge and stored in a table in a memory during an instantiation procedure.

10. The non-transitory machine readable medium of claim 7, wherein the operations further comprise local switching.

11. The non-transitory machine readable medium of claim 7, wherein the first port extender tag comprises:

a source identifier (SRC) field set to an extended port associated with the access port; and a destination identifier (DST) field set to 0.

12. The non-transitory machine readable medium of claim 7, wherein the operations further comprise:

receiving a tagged packet on a first cascade port of the port extender, the tagged packet including a second source MAC address and a second destination MAC address and a second port extender tag that includes a SRC and a DST field;

determining whether the second source MAC address is found in the lookup table;

determining whether the second destination MAC address is found in the lookup table;

setting the DST field to a virtual port to form a second packet and forwarding the second packet toward the second destination MAC address using a second cascade port of the port extender when both the second source and second destination MAC addresses are found in the lookup table and the second destination MAC address is associated with the second cascade port;

removing the second port extender tag to form a third packet and forwarding the third packet toward the second destination MAC address using the access port when both the second source and second destination MAC addresses are found in the lookup table and the second destination MAC address is associated with the access port; and forwarding the tagged packet using only the uplink port when one or both of the second source MAC address or the second destination MAC address is not found in the lookup table.

13. A method of operating a port extender, comprising:

receiving, from a controlling bridge separate from the port extender, table entries;

receiving a first packet on an access port of the port extender, the first packet including a source media access control (MAC) address and a destination MAC address;

determining whether the source MAC address is found in the table entries;

determining whether the destination MAC address is found in the table entries;

forwarding the first packet toward the destination MAC address in response to determining that both the source and destination MAC addresses are found in the table entries; and in response to determining that one or both of the source or destination MAC addresses is not found in the table entries:

adding a first port extender tag to the first packet, the first port extender tag indicating to the controlling bridge that source address learning be performed on the first packet with the first port extender tag; and forwarding the first packet with the first port extender tag toward the controlling bridge using an uplink port, the uplink port coupling the port extender to an upstream port extender or the controlling bridge.

14. The method of claim 13, further comprising executing an access control logic (ACL) and quality of service (QoS) function.

15. The method of claim 14, further comprising receiving ACL and QoS policies from the controlling bridge.

16. The method of claim 13, further comprising performing local switching.

17. The method of claim 13, wherein the first port extender tag comprises:

a source identifier (SRC) field set to an extended port associated with the access port; and a destination identifier (DST) field set to 0.

18. The method of claim 13, further comprises:

receiving a tagged packet on a first cascade port of the port extender, the tagged packet including a second source MAC address and a second destination MAC address and a second port extender tag that includes a SRC and a DST field;

determining whether the second source MAC address is found in the table entries;

determining whether the second destination MAC address is found in the table entries; and setting the DST field to a virtual port to form a second packet and forwarding the second packet toward the second destination MAC address using a second cascade port of the port extender when both the second source and second MAC addresses are found in the table entries and the second destination MAC address is associated with the second cascade port.

19. The method of claim 13, further comprising:

receiving a tagged packet on a first cascade port of the port extender, the tagged packet including a second source MAC address and a second destination MAC address and a second port extender tag that includes a SRC and a DST field;

determining whether the second source MAC address is found in the table entries;

determining whether the second destination MAC address is found in the table entries; and removing the second port extender tag to form a second packet and forwarding the second packet toward the second destination MAC address using the access port when both the second source and second destination MAC addresses are found in the table entries and the second destination MAC address is associated with the access port.

20. The method of claim 13, further comprising:

receiving a tagged packet on a first cascade port of the port extender, the tagged packet including a second source MAC address and a second destination MAC address and a second port extender tag that includes a SRC and a DST field;

determining whether the second source MAC address is found in the table entries;

determining whether the second destination MAC address is found in the table entries; and forwarding the tagged packet using only the uplink port when one or both of the second source MAC address or the second destination MAC address is not found in the table entries.

* * * * *